(12) United States Patent
Deutsch et al.

(10) Patent No.: US 11,276,262 B2
(45) Date of Patent: Mar. 15, 2022

(54) VOTING SYSTEMS AND METHODS FOR PROCESSING PROVISIONAL BALLOTS AND PERFORMING A RISK LIMITING AUDIT

(71) Applicant: ELECTION SYSTEMS & SOFTWARE, LLC, Omaha, NE (US)

(72) Inventors: Herman Deutsch, Mundelein, IL (US); Mike Dvorak, Plattsmouth, NE (US)

(73) Assignee: ELECTION SYSTEMS & SOFTWARE, LLC, Omaha, NE (US)

( * ) Notice: Subject to any disclaimer, the term of this patent is extended or adjusted under 35 U.S.C. 154(b) by 0 days.

(21) Appl. No.: 16/942,637

(22) Filed: Jul. 29, 2020

(65) Prior Publication Data

US 2020/0357215 A1    Nov. 12, 2020

Related U.S. Application Data

(63) Continuation-in-part of application No. 16/256,420, filed on Jan. 24, 2019, now Pat. No. 11,011,005.

(51) Int. Cl.
*G06K 17/00* (2006.01)
*G07C 13/00* (2006.01)
(Continued)

(52) U.S. Cl.
CPC ........... *G07C 13/00* (2013.01); *G06F 16/901* (2019.01); *G06F 16/9035* (2019.01);
(Continued)

(58) Field of Classification Search
CPC ....... G07C 13/00; G06F 16/93; G06F 16/901; G06F 16/9038; G06F 16/9035;
(Continued)

(56) References Cited

U.S. PATENT DOCUMENTS

| 7,635,087 B1 * | 12/2009 | Chung ................... G06K 7/14 235/386 |
| 2005/0211778 A1 * | 9/2005 | Biddulph ............... G07C 13/00 235/386 |

(Continued)

*Primary Examiner* — Thien M Le
(74) *Attorney, Agent, or Firm* — Stinson LLP

(57) ABSTRACT

A voting system comprises a ballot tabulation device that tabulates each of a plurality of paper ballots by determining one or more contest selections marked on the paper ballot and storing the contest selections within a cast vote record (CVR) for the paper ballot. One or more of the paper ballots comprises a provisional ballot on which is printed an identification code that represents or is associated with a voter code assigned to a voter who cast the provisional ballot. During the tabulation process, a direct or indirect link is provided between the CVR and the voter code for the provisional ballot. The voting system also comprises an election management system that identifies the CVR associated with each of one or more inputted voter codes, i.e., the voter codes assigned to voters who have had a change in eligibility status, and updates the total vote count to include or exclude the contest selections stored within that CVR as applicable. Preferably, the election management system is configured to prevent a user from accessing the contest selections stored in the CVR for the provisional ballot based on the voter code. For audit purposes, a ballot code may also be printed on each paper ballot, wherein the ballot code may optionally serve as the identification code for a provisional ballot.

15 Claims, 15 Drawing Sheets

(51) Int. Cl.
*G06F 16/901* (2019.01)
*G06K 7/14* (2006.01)
*G06F 16/9035* (2019.01)
*G06F 16/93* (2019.01)
*G06F 16/9038* (2019.01)
*G06V 30/40* (2022.01)

(52) U.S. Cl.
CPC .......... *G06F 16/9038* (2019.01); *G06F 16/93* (2019.01); *G06K 7/1434* (2013.01); *G06V 30/40* (2022.01)

(58) Field of Classification Search
CPC ............. G06K 7/1434; G06K 9/00442; G06K 19/07722; G06K 19/07743; G06K 19/07747; G06K 19/07749; G06K 19/07756; G06K 19/07769; G06K 19/07775; B32B 2425/00; H01Q 1/2216; H01Q 1/2283; H04B 5/0031

USPC .................................................. 235/386, 375
See application file for complete search history.

(56) References Cited

U.S. PATENT DOCUMENTS

| | | | | |
|---|---|---|---|---|
| 2007/0007341 A1* | 1/2007 | Poulin | .................... | G07C 13/00 235/386 |
| 2010/0230491 A1* | 9/2010 | Bolton | .................... | G07C 13/00 235/386 |
| 2011/0089236 A1* | 4/2011 | Chung | .................... | B42D 25/27 235/386 |
| 2013/0301873 A1* | 11/2013 | Hoover | .................... | G06T 11/60 382/103 |
| 2014/0231513 A1* | 8/2014 | Brockhouse | ........... | G07C 13/02 235/386 |

* cited by examiner

FIG. 7

PRIMARY ELECTION
COUNTY NAME, STATE
ELECTION DATE
PRECINCT NAME, NUMBER

BMW (English Only) DEMO

Provisional ☒
0123456789

INSTRUCTIONS TO VOTERS: To vote, fill in the oval to the LEFT of your choice. To cast a write-in vote, fill in the oval to the left of the blank space provided and print the candidate's name in the space. For specific information refer to the card of instructions posted in the voting booth. If you tear, soil, deface or erroneously mark this ballot, return it Election Judge and obtain another.

| BEST AUTOMOBILE MANUFACTURER<br>Vote for One | BEST VOCAL ARTIST<br>Vote for no more than Two | BEST ICE-CREAM FLAVOR<br>Vote for One |
|---|---|---|
| ○ BMW | ○ FRANK SINATRA | ● CHOCOLATE |
| ○ MERCEDES | ○ ELVIS | ○ STRAWBERRY |
| ○ GENERAL MOTORS | ○ PATSY CLINE | ○ VANILLA |
| ○ HONDA | ○ JANIS JOPLIN | ○ _____ Write-in |
| ○ FERRARI | ○ BUDDY HOLLY | |
| ○ JAGUAR | ● BARRY WHITE | |
| ○ FORD | ○ 'MAMA' CASS ELLIOT | |
| ● VOLVO | ○ STEVIE RAY VAUGHAN | |
| ○ _____ Write-in | ○ BLUE HOLIDAY | |
| | ○ _____ Write-in | |
| | ○ _____ Write-in | |

This ballot is for demonstration purposes only and is Not an Official Election Ballot. Use of this ballot for any purpose other than for demonstration purposes is strictly prohibited and shall not be supported by Election System & Software, Inc.

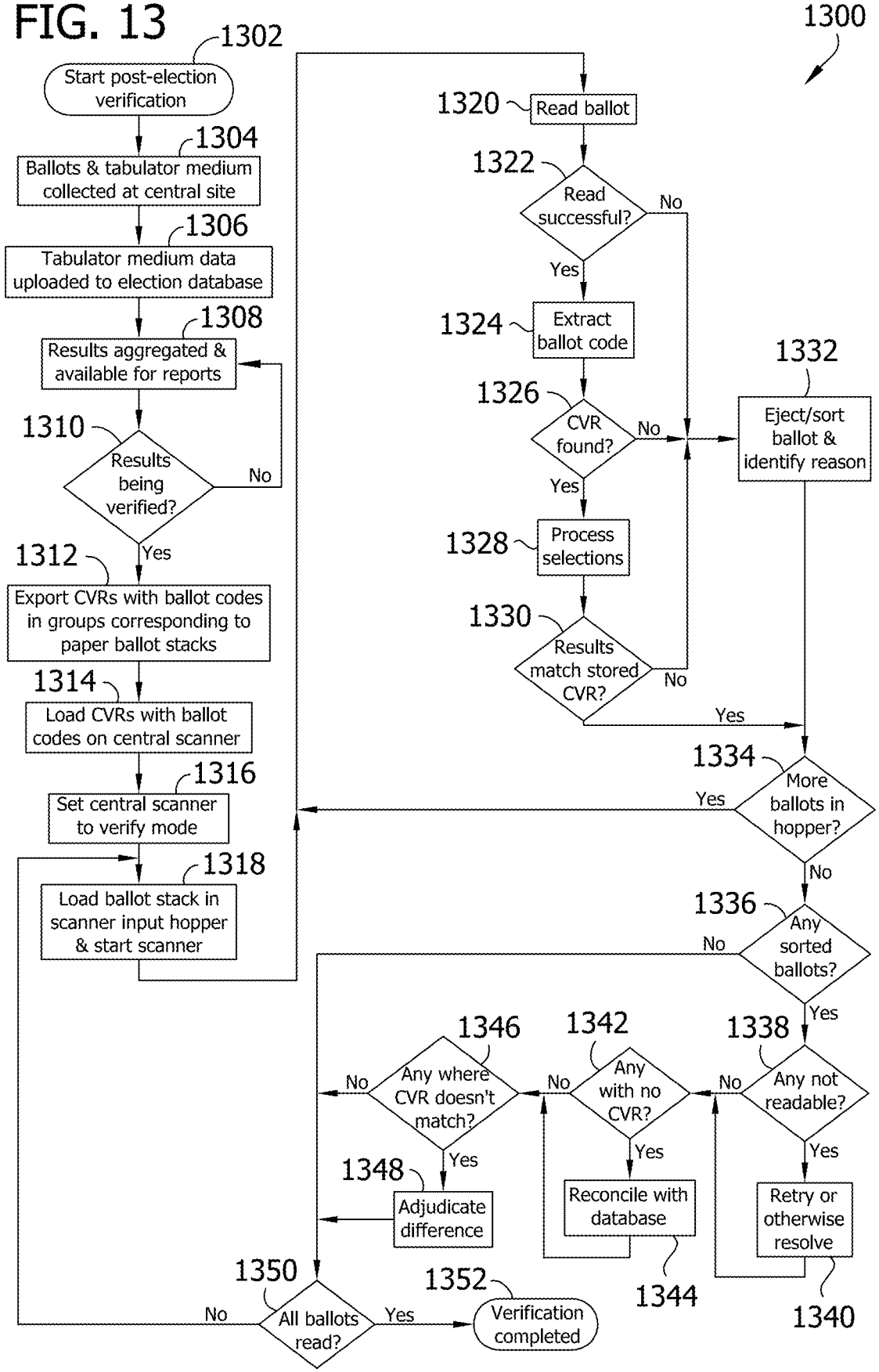

VOTING SYSTEMS AND METHODS FOR PROCESSING PROVISIONAL BALLOTS AND PERFORMING A RISK LIMITING AUDIT

CROSS-REFERENCE TO RELATED APPLICATIONS

This application claims priority to and is a continuation-in-part of U.S. patent application Ser. No. 16/256,420, filed on Jan. 24, 2019, which is incorporated herein by reference in its entirety.

BACKGROUND OF THE INVENTION

1. Field of the Invention

The present disclosure is generally related to voting systems and methods and, more particularly, to systems and methods for processing provisional ballots and optionally performing a risk limiting audit.

2. Description of Related Art

Provisional ballots are ballots that are voted and cast in a manner that allows them to be subsequently validated and included in the election results or invalidated and excluded from the election results.

In certain cases, provisional ballots are provided to all voters who vote prior to election day, such as during an early voting period or in-person absentee voting period. Each of these voters casts a provisional ballot so that, after the election, election officials can confirm that the voter did not subsequently cast another ballot on the day of the election. In some jurisdictions, all of the provisional ballots cast during the early voting/in-person absentee voting period are included in the initial election results. Then, if it is determined after the election that a voter also voted on the day of the election, the votes cast on that voter's provisional ballot are removed from the election results.

In other cases, provisional ballots are provided to voters whose eligibility to vote in an election cannot be confirmed at the polling location on election day. This typically occurs when a voter is not listed in the voter registration records for the polling location. There are many reasons why a voter may not be listed in the voter registration records, e.g., the voter may not have registered to vote prior to the registration deadline, the voter may have recently moved, the polling location may not be associated with the voter's permanent residence, or some other reason. In some jurisdictions, provisional ballots provided to voters on the day of the election are not included in the election results until the voter's eligibility has been confirmed—i.e., the votes cast on a provisional ballot are later added to the election results if it is determined that the voter was eligible to vote in the election.

In both of the cases mentioned above, the voter is identified with a code, which may be selected from a pre-designated list of codes or issued by an electronic pollbook. The voter's provisional ballot is also indirectly identified by the code (e.g., by placing the ballot in an envelope labelled with the code, as described below) so that the ballot can be tracked using the code. After the close of the election, the eligibility of each voter who has been designated provisional or challenged (e.g., given a code) is determined and a process is used to include one or more of the provisional ballots in the election results and/or exclude one or more of the provisional ballots from the election results.

A variety of different types of paper-based voting systems are used in the United States and throughout the world, and may include one or more of the following types of voting equipment: ballot tabulation devices (e.g., a precinct-based or central ballot scanner and tabulator) that read a hand-marked paper ballot or a paper ballot generated using a ballot marking device and store the contest selections within a cast vote record (CVR) for the ballot; ballot marking devices that allow a voter to electronically enter his or her contest selections and then machine-mark the contest selections on a pre-printed ballot; and ballot marking devices that allow a voter to electronically enter his or her contest selections and then prints a paper ballot that includes a summary of the contest selections. In the latter two cases, the paper ballot may be subsequently discharged from the ballot marking device for insertion into a separate ballot tabulation device (as described above), or, the paper ballot may be retained by the ballot marking device for scanning and storage of the contest selections within a CVR for the ballot (i.e., the device operates as a combined ballot marking device/ballot tabulation device). Jurisdictions using paper-based voting systems utilize different techniques for processing provisional ballots in order to maintain the anonymity of voters who cast the provisional ballots.

In some jurisdictions, a voter receives a pre-printed paper ballot on which the voter hand-marks the contest selections (e.g., by darkening mark spaces on the ballot located adjacent the pre-printed contest choices) or utilizes a ballot marking device to machine-mark the contest selections on the paper ballot. Each ballot that is identified as a provisional ballot is placed in a first envelope, which is in turn inserted into a second envelope. The second outer envelope is labeled with the code associated with the voter while the first inner envelope is not marked to preserve voter anonymity and secrecy. After the eligibility of each provisional voter is determined, an election official uses the codes labeled on the second outer envelopes to locate the ballots of voters who have been deemed eligible to vote so that the election results may be updated to include the contest selections marked on those ballots. For each of those ballots, the election official removes the first inner envelope from the second outer envelope and places it in a pile to be processed for inclusion in the election results. In this manner, the election official is able to make a determination about the eligibility of the voter without ever having visual access to the provisional ballot and the contest selections marked thereon, thereby preserving the anonymity and secrecy of the provisional ballot.

In other jurisdictions, each provisional ballot includes a review box that is marked to indicate that the ballot is a provisional ballot (wherein the review box may be hand-marked by a poll worker or printed by a ballot marking device). When a provisional ballot is inserted into a ballot tabulation device for scanning and tabulation, the device reads the marked review box and unconditionally returns the paper ballot to the voter and does not store the contest selections in a CVR. The returned paper ballot is placed in a first envelope, which is in turn inserted into a second envelope that is labeled with the code associated with the voter, and then processed in the same manner as the paper ballot described above.

It can be appreciated that conventional voting systems and methods used to process paper ballots (whether a pre-printed paper ballot hand-marked by voters, a pre-printed paper ballot machine-marked by a ballot marking device, or a paper ballot with a vote summary printed by a ballot marking device) are not ideal insofar as they require the manual handling of multiple ballot envelopes. Thus, there is a need for improved voting systems and methods that enable paper provisional ballots to be processed in a manner that maintains the anonymity of the voters who cast the ballots.

BRIEF SUMMARY OF THE INVENTION

The present invention is directed to voting systems and methods for processing provisional paper ballots cast by a voter in an election whose eligibility to vote in the election is not yet determined.

A voting system in accordance with one exemplary embodiment of the invention described herein comprises a ballot tabulation device configured to tabulate a plurality of paper ballots cast by a plurality of voters in an election. One or more of the paper ballots comprises a provisional ballot on which is printed an identification code that represents a voter code assigned to a voter who cast the provisional ballot. The ballot tabulation device tabulates each paper ballot by determining one or more contest selections marked on the paper ballot and storing the contest selections within a cast vote record (CVR) for the paper ballot. For each provisional ballot, the ballot tabulation device additionally provides a link between the CVR and the voter code for the provisional ballot.

The voting system also comprises an election management system configured to use the link to identify the CVR associated with each of one or more voter codes identified as having a change in eligibility status after the close of the election. The election management system is configured to update the total vote count within the election results by either (i) including the contest selections stored within the CVR in the total vote count when an eligibility determination indicates the voter associated with the identified voter code is an eligible voter or (ii) excluding the contest selections stored within the CVR from the total vote count when an eligibility determination indicates the voter associated with the identified voter code is an ineligible voter.

A voting system in accordance with another exemplary embodiment of the invention described herein comprises a ballot tabulation device configured to tabulate a plurality of paper ballots cast by a plurality of voters in an election, wherein one or more of the paper ballots comprises a provisional ballot. The ballot tabulation device tabulates each paper ballot by determining one or more contest selections marked on the paper ballot and storing the contest selections within a CVR for the paper ballot. For each provisional ballot, the ballot tabulation device is further configured to provide a user interface that enables an operator to enter a voter code assigned to a voter who cast the provisional ballot. In response, the ballot tabulation device is configured to print an identification code associated with the voter code on the provisional ballot and provide a link between the CVR and the voter code for the provisional ballot.

The voting system also comprises an election management system configured to use the link to identify the CVR associated with each of one or more voter codes identified as having a change in eligibility status after the close of the election. The election management system is configured to update the total vote count within the election results by either (i) including the contest selections stored within the CVR in the total vote count when an eligibility determination indicates the voter associated with the identified voter code is an eligible voter or (ii) excluding the contest selections stored within the CVR from the total vote count when an eligibility determination indicates the voter associated with the identified voter code is an ineligible voter.

A voting system in accordance with yet another exemplary embodiment of the invention described herein comprises a ballot tabulation device configured to tabulate a plurality of paper ballots cast by a plurality of voters in an election. One or more of the paper ballots comprises a provisional ballot on which is printed an identification code associated with a voter code assigned to a voter who cast the provisional ballot. The ballot tabulation device tabulates each paper ballot by determining one or more contest selections marked on the paper ballot and storing the contest selections within CVR for the paper ballot and, for each provisional ballot, additionally providing a link between the CVR and the voter code for the provisional ballot.

The voting system also comprises an election management system configured to identify the CVR associated with each of one or more voter codes identified as having a change in eligibility status after the close of the election. The election management system is configured to update the total vote count within the election results by either (i) including the contest selections stored within the CVR in the total vote count when an eligibility determination indicates the voter associated with the identified voter code is an eligible voter or (ii) excluding the contest selections stored within the CVR from the total vote count when an eligibility determination indicates the voter associated with the identified voter code is an ineligible voter. The election management system is configured to prevent a user from accessing the contest selections stored in the CVR for the provisional ballot.

The voting systems and methods of the present invention may optionally be configured to enable the performance of a risk limiting audit (RLA). This aspect of the disclosure requires a voting system to print a unique ballot code on each paper ballot and store the ballot code in association with the CVR for each ballot. The ballot codes can then be used to automatically locate certain physical ballots or ballot images and their corresponding CVRs (the ballots/images and CVRs for the ballots to be audited) and enable a comparison therebetween. In some embodiments, the ballot code may optionally serve as the identification code for a provisional ballot.

Various other embodiments and features of the present invention are described in detail below, or will be apparent to one skilled in the art based on the disclosure provided herein, or may be learned from the practice of the invention.

BRIEF DESCRIPTION OF THE DRAWINGS

FIG. 7 illustrates a second exemplary paper ballot that may be hand-marked by a voter or machine-marked by a ballot marking device and tabulated by the ballot tabulation device of FIG. 3.

FIG. 13 is a flow diagram of a method for performing a verification audit in accordance with an embodiment of the invention.

DETAILED DESCRIPTION OF EXEMPLARY EMBODIMENTS

Figure 1A:
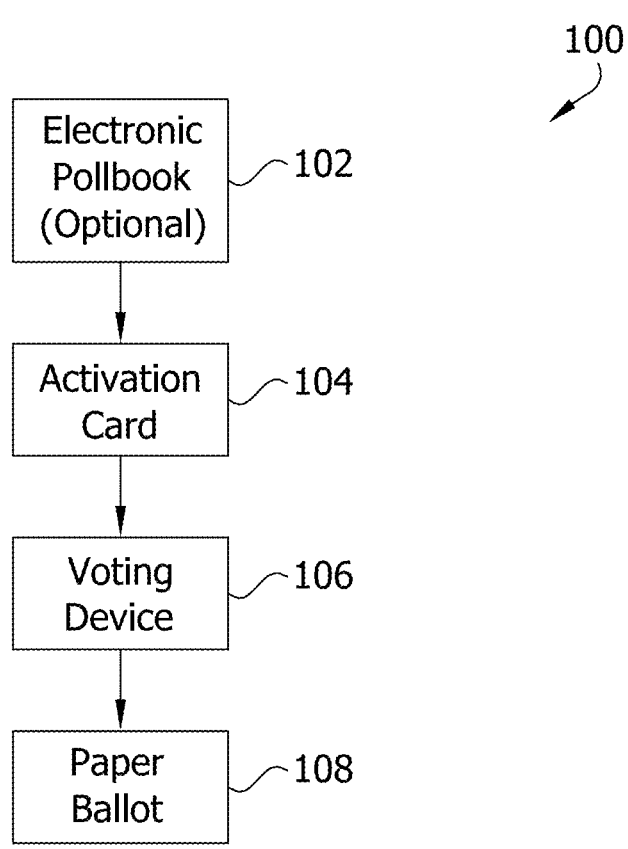
FIG. 1A is a block diagram of an exemplary voting system that includes an electronic pollbook and a voting device in accordance with an embodiment of the invention.

The present invention is directed to voting systems and methods for processing provisional ballots and, optionally, performing a risk limiting audit (RLA). While the invention will be described in detail below with reference to various exemplary embodiments, it should be understood that the invention is not limited to the specific system configurations or methodologies of these embodiments. In addition, although the exemplary embodiments are described as embodying several different inventive features, one skilled in the art will appreciate that any one of these features could be implemented without the others in accordance with the invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

I. Provisional Ballot Processing

Generally, the present disclosure describes voting systems and methods for processing provisional ballots cast in jurisdictions that utilize paper-based voting systems, such as those that utilize a ballot marking device and/or a ballot tabulation device (e.g., a precinct-based ballot scanner and tabulator). Of course, one skilled in the art will understand that the present invention is not limited in use and scope with voting systems that utilize a ballot marking device and/or a ballot tabulation device and may be used with other types of voting equipment.

The term "provisional ballot" as used herein means any paper ballot cast by a voter whose eligibility to vote in the election may be changed after the close of the election. In some embodiments, the voting systems and methods described herein may be used to cast a provisional ballot during an early voting/in-person absentee voting period in a manner in which the contest selections on each ballot are recorded, e.g., included within a CVR, at the polling location. Then, after the close of the election, one or more of the provisional ballots may be validated and included in the election results and/or invalidated and excluded from the election results, all while preserving the anonymity of each voter who cast the provisional ballot. In other embodiments, the voting systems and methods described herein may be used to cast a provisional ballot on election day in a manner in which the contest selections on each ballot are recorded, e.g., included within a CVR, at the polling location. Then, after the close of the election, one or more of the provisional ballots may be validated and included in the election results and/or invalidated and excluded from the election results, all while preserving the anonymity of each voter who cast the provisional ballot. Of course, provisional ballots may be used in other circumstances within the scope of the present invention.

In some embodiments, the provisional ballot comprises a paper ballot on which the voter hand-marks his or her contest selections (e.g., by darkening mark spaces on the ballot located adjacent the pre-printed contest choices) or utilizes a ballot marking device to machine-mark the contest selections on the paper ballot. In other embodiments, the provisional ballot comprises a paper activation card or other paper medium onto which a summary of the contest selections is printed to create a paper ballot. Of course, other types of paper ballots may also be used within the scope of the present invention.

Each provisional ballot is associated with a unique voter code assigned to the voter who cast the ballot. The voter code may comprise a numeric string, an alphanumeric string, or other types of codes known in the art. In some embodiments, the voter code is a serialized number. In other embodiments, the voter code is a random number, e.g., a number generated using a random number generator with a random seed (e.g., the fractional second digits in a real time clock). A precinct identifier and/or a machine identifier may optionally be appended to the voter code in order to eliminate inadvertent duplicate code assignments.

In some embodiments, an identification code associated with or representing the voter code assigned to the voter is printed on each provisional ballot. The voter code must be linked to the CVR created when the provisional ballot is scanned and tabulated by a ballot tabulation device so that the contest selections contained within the CVR may be included in or excluded from the election results after the close of an election. In some embodiments, the voter code is indirectly linked to the CVR, i.e., an indirect link is provided between the voter code and the CVR in order to maintain ballot anonymity and secrecy. In other embodiments, the voter code is directly linked to the CVR, and the election management system is configured to prevent a user from accessing the contest selections stored in the CVR for the provisional ballot based on the voter code in order to maintain ballot anonymity and secrecy.

In some embodiments, the identification code printed on the provisional ballot comprises the voter code itself, which is both human-readable and machine-readable, or a machine-readable barcode that encodes the voter code. Exemplary barcodes that may be used to encode the voter code (and optional precinct identifier and/or machine identifier) include, but are not limited to, linear barcodes (e.g., one dimensional barcodes), matrix barcodes (e.g., two dimensional barcodes, quick response (QR) codes, etc.), and the like. In these embodiments, there are a number of different ways in which the ballot tabulation device may provide the link between the voter code and the CVR.

In one embodiment, the ballot tabulation device may provide an indirect link between the voter code and the CVR by creating a cross-reference table that associates the voter code with a CVR identifier, i.e., an identifier of the CVR containing the contest selections for the provisional ballot. After the close of an election, the cross-reference table may be accessed to identify the CVR associated with a particular voter code so that the contest selections contained within that CVR may be included in or excluded from the election results. As used herein, the term "cross-reference table" means any type of data structure known in the art that is able to store data in an associative manner.

In another embodiment, if the CVR is encrypted, it can contain restricted fields that are not accessible by an operator of the system. If the contest selections are stored in the restricted fields, the voter code can be embedded in the CVR itself. In this case, the linkage between the voter code and the contest selections stored in the CVR would only be available to the system. Of course, other ways of restricting operator access to the contest selections stored in the CVR may also be used.

In other embodiments, the identification code printed on the provisional ballot comprises a ballot code, which is both human-readable and machine-readable, or a machine-readable barcode that encodes the ballot code. A ballot code is printed on all paper ballots for audit purposes (not just provisional ballots), as described in greater detail below. In this case, the ballot tabulation device creates a cross-reference table that associates the voter code with the ballot code for each provisional ballot. Thus, the ballot code functions as the identification code for the provisional ballot. In these embodiments, the ballot tabulation device may provide an indirect link between the voter code and the CVR by creating another cross-reference table that associates the voter code with a CVR identifier, i.e., an identifier of the CVR containing the contest selections for the provisional ballot. After the close of an election, the cross-reference table may be accessed to identify the CVR associated with a particular voter code so that the contest selections contained within that CVR may be included in or excluded from the election results. If the voter code is directly linked to the CVR, the election management system is configured to prevent a user from accessing the contest selections stored in the CVR for the provisional ballot based on the voter code. Further aspects of the system relating to use of the ballot code for audit purposes are described below.

In yet other embodiments, the identification code printed on the provisional ballot comprises an encrypted voter code, which is both human-readable and machine-readable, or a machine-readable barcode that encodes the encrypted voter code. Exemplary barcodes that may be used to encode the encrypted voter code (and optional precinct identifier and/or machine identifier) include, but are not limited to, linear barcodes (e.g., one dimensional barcodes), matrix barcodes (e.g., two dimensional barcodes, quick response (QR) codes, etc.), and the like. The encrypted voter code may be generated, for example, by encrypting the voter code using an encryption key (wherein a common encryption key is used to encrypt all of the coded ballots). Of course, other types of obfuscated voter codes may also be used, such as codes in which the characters of the voter code are scrambled in a repeatable manner to generate the code or codes in which the arithmetic addition or otherwise inclusion and melding of a secret constant in a repeatable manner is used to generate the code. Thus, the term "encrypted voter code" as used herein includes codes generated using an encryption key or other obfuscation methods known in the art. In these embodiments, there are a number of different ways in which the ballot tabulation device may provide the link between the voter code and the CVR.

In one embodiment, the ballot tabulation device provides the link between the voter code and the CVR by creating a cross-reference table that associates the encrypted voter code with the CVR identifier. After the close of an election, a particular voter code may be encrypted using the same encryption key (i.e., the encryption key used to generate the identification codes), and then the cross-reference table may be accessed to identify the CVR associated with the voter code as encrypted so that the contest selections contained within that CVR may be included in or excluded from the election results.

In another embodiment, the ballot tabulation device provides the link between the voter code and the CVR by storing the encrypted voter code within the CVR for the provisional ballot. After the close of an election, a particular voter code may be encrypted using the same encryption key (i.e., the encryption key used to generate the identification codes), and the CVR that stores the voter code as encrypted may be identified so that the contest selections contained within that CVR may be included in or excluded from the election results.

In yet another embodiment, the ballot tabulation device again provides the link between the voter code and the CVR by storing the encrypted voter code within the CVR for the provisional ballot. After the close of an election, the encrypted voter code stored within each CVR is decrypted using a decryption key (i.e., a decryption key corresponding to the encryption key used to generate the identification codes), and then the CVR that stores a particular voter code may be identified so that the contest selections contained within that CVR may be included in or excluded from the election results.

Of course, one skilled in the art will appreciate that there are other ways in which the ballot tabulation device may provide a link between the voter code and the CVR, all of which are included within the scope of the present invention.

Various voting systems and methods that may be used to implement the present invention will now be described. Of course, it should be understood that these voting systems and methods are merely provided as exemplary embodiments and that other types of voting systems and methods may also be used within the scope of the invention.

A. Voting Systems

Referring to FIG. 1A, a voting system that may be used in some embodiments of the invention is generally indicated by reference number 100. In general terms, the voting system 100 includes an electronic pollbook 102 configured to generate an activation card 104 that is provided to a voter. The activation card 104 is inserted into a voting device 106 to activate a voting session. The voting device 106 is configured to provide a user interface that enables the voter to input his or her contest selections, and then mark/print the contest selections on the activation card 104 to create a paper ballot 108. Thus, the paper ballot 108 comprises the activation card 104 with the contest selections printed thereon.

In most jurisdictions, the electronic pollbook 102 has access to the voter registration records and may be used to check in a voter at a polling location. Preferably, the electronic pollbook 102 is configured to determine an election code (e.g., 000-999) that identifies the precinct and/or ballot style for the voter. The election code is printed on the activation card 104 in machine-readable form (and optionally human-readable form) so that it can be read by the voting device 106 and/or ballot tabulation device 154 to determine the appropriate ballot style for the voter (i.e., the contests and contest choices applicable to that voter) based on a pre-loaded election definition. The election definition is commonly created via an election management system 156 (FIG. 1B), which is typically used at a central election office. The election management system 156 enables an administrator to create an election database that includes all of the district, contest, candidate and precinct information for the jurisdiction. This information is used to create the election definition files for each of the voting devices in the jurisdiction.

In an alternative embodiment, a blank card may be used as the activation card 104 that activates the voting device 106. However, in this embodiment, the poll worker must enter the voter's precinct and/or ballot style into the voting device 106 (unless, of course, there is only one precinct and one ballot style in the election definition).

The electronic pollbook 102 is also configured to determine if the voter is casting a type of ballot requiring a voter code (e.g., a provisional ballot) and, if so, provide an indication that the voter is to be assigned a voter code. In one embodiment, the electronic pollbook 102 is configured to automatically assign the voter code from a preloaded list of voter codes. In another embodiment, a poll worker enters the voter code into the electronic pollbook 102, e.g., the electronic pollbook 102 is configured to prompt the poll worker to enter the assigned voter code.

In some embodiments, the electronic pollbook 102 is configured to generate an identification code based on the voter code and print the identification code on the activation card 104. As described above, the identification code printed on the activation card 104 may comprise the voter code itself, a barcode that encodes the voter code, an encrypted voter code, a barcode that encodes the encrypted voter code, and the like. Of course, the identification code may alternatively be generated and printed by the voting device 106 or by a ballot tabulation device 154 (FIG. 1B), as described in greater detail below.

An example of a suitable electronic pollbook that may be modified for use as the electronic pollbook 102 of voting system 100 (e.g., by adding all of the functionality relating to the entry of a voter code and generation and printing of an identification code on the paper ballot 108, as applicable) is the ExpressPoll® electronic pollbook available from Election Systems & Software, LLC.

The voting device 106 may have a variety of different configurations and may be used for different purposes. In some embodiments, the voting device 106 is utilized only as a ballot marking device. For example, in one embodiment, a summary of the voter's contest selections is printed on the activation card 104 to create the paper ballot 108. The paper ballot 108 is then discharged from the voting device 106 to the voter, and the voting device 106 does not retain a record of the contest selections after the voting session has ended. The voter then inserts the paper ballot 108 into the ballot tabulation device 154 (FIG. 1B) for scanning and tabulation. In other embodiments, the voting device 106 is used both as a ballot marking device in which a summary of the voter's contest selections is printed on the activation card 104 to create the paper ballot 108, and also as a ballot tabulation device. In this case, the paper ballot 108 may be retained by the voting device 106 for scanning and tabulation, or, the paper ballot 108 may be discharged from the voting device 106 to the voter whereby the voter re-inserts the paper ballot 108 back into the voting device 106 for scanning and tabulation. The scanning and tabulation aspect of the voting device 106 will be described in greater detail below.

The voting device 106 is configured to receive the activation card 104 and activate the voting session in response thereto, e.g., the voting device 106 may read the machine-readable election code on the activation card 104 to determine the appropriate ballot for the voter (i.e., the contests and contest choices applicable to that voter) based on a pre-loaded election definition. The voting device 106 is then configured to provide a user interface that presents the contest choices for each contest to the voter. The user interface also enables the voter to input one or more contest selections for each of the contests. A contest selection comprises the option selected by the voter from the contest choices for a particular contest. Each contest may allow the voter to make one contest selection (e.g., select one of the candidates for a particular race) or more than one contest selection (e.g., select two of the candidates for a particular race). If a voter does not make the permitted number of contest selections for a particular contest, it may be considered a ballot irregularity (e.g., under vote, over vote, etc.). It should be understood that the systems and methods described herein can accommodate all ballots regardless of whether or not a particular ballot contains a ballot irregularity.

The voting device 106 is also configured to print the contest selections made by the voter on the activation card 104 to create a paper ballot 108. The contest selections may be printed in human-readable form and/or in machine-readable form (e.g., the contest selections may be encoded in a barcode printed on the paper ballot 108). In one embodiment, the voting device 106 prints a summary of the contest selections in both human-readable and machine-readable form.

If the paper ballot 108 comprises a provisional ballot and the identification code was not printed on the activation card 104 by the electronic pollbook 102, the voting device 106 may be further configured to generate the identification code based on the voter code and print the identification code on the paper ballot 108. In one embodiment, the voting device 106 is configured to determine that the voter is casting a provisional ballot (e.g., by receiving an input from the poll worker or reading information printed on the activation card 104 by the electronic pollbook 102) and then prompt the poll worker to enter the assigned voter code (i.e., the voter code assigned by the electronic pollbook 102). As described above, the identification code printed on the paper ballot 108 may comprise the voter code itself, a barcode that encodes the voter code, an encrypted voter code, a barcode that encodes the encrypted voter code, and the like. Of course, the identification code may alternatively be generated and printed by the electronic pollbook 102, as described above, or by the ballot tabulation device 154 (FIG. 1B), as described in greater detail below. The voting device 106 may print the identification code on the paper ballot 108 at the same time that it prints the voter's contest selections, as described above.

Figure 2:
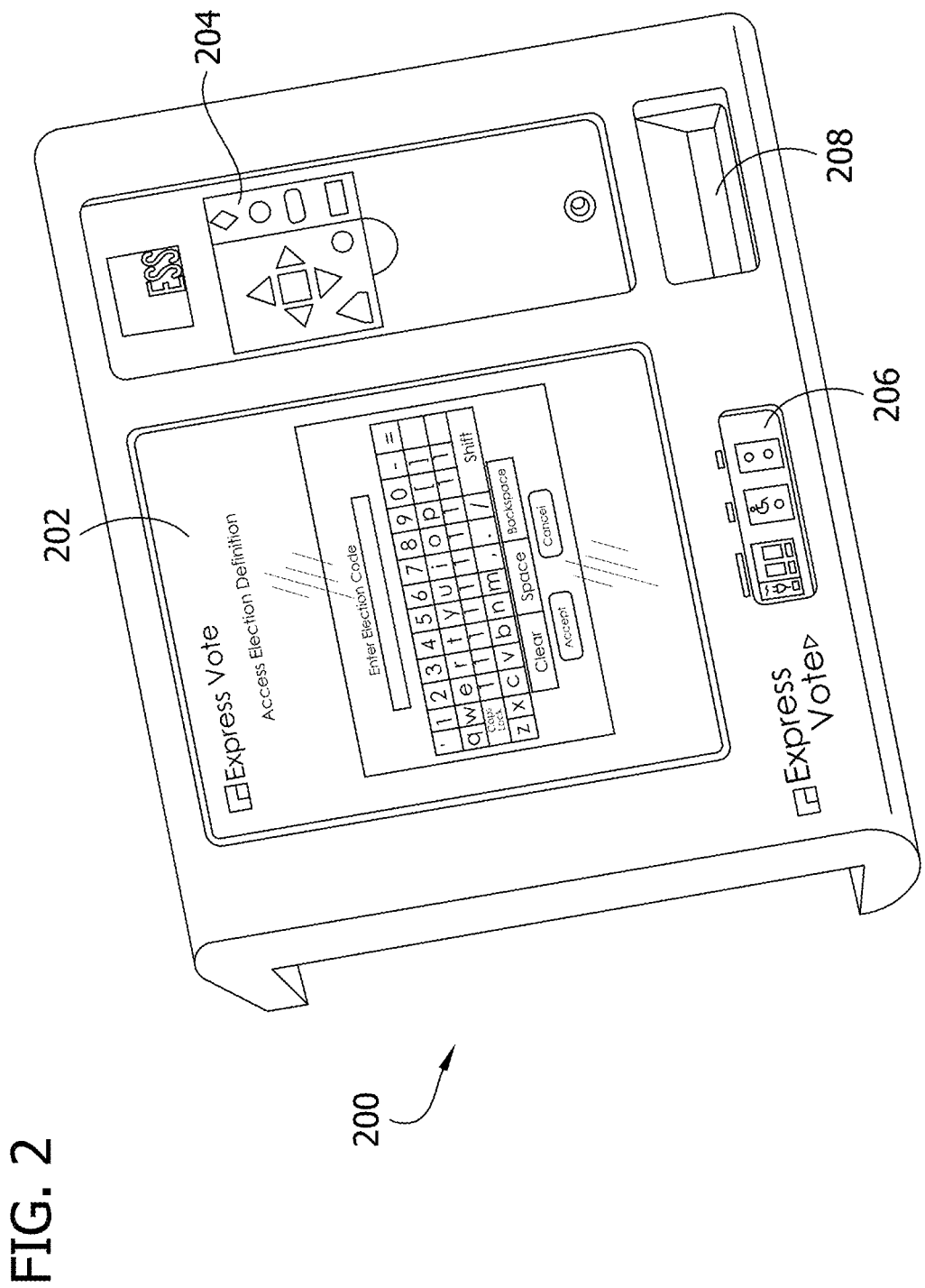
FIG. 2 is a perspective view of an exemplary voting device that may be used in the voting system of FIG. 1A.

Referring to FIG. 2, an exemplary embodiment of the voting device 106 is generally indicated by reference number 200. The voting device 200 generally includes a touchscreen display 202, a keypad 204, an auxiliary panel 206, and an opening 208, as described below. The voting device 200 also includes an internal printer (not shown) that prints the contest selections on the activation card 104 and, for a provisional ballot, may also print the identification code, as described above. Preferably, voting device 200 complies with the requirements of the Americans with Disabilities Act (ADA), the 2002 and 2005 voluntary voting system guidelines (VVSG), and the Help America Vote Act of 2002.

The opening 208 in the voting device 200 is configured to receive an activation card 104 from a voter. As described above, the activation card 104 preferably includes a machine-readable marking (e.g., a barcode) that can be read by voting device 200 to determine the appropriate electronic ballot for the voter and, if a provisional ballot, may optionally include an identification code that was printed on the activation card 104 by an electronic pollbook 102. If the identification code was not printed on the activation card 104 by an electronic pollbook 102, the voting device 200 is configured to determine that the voter is casting a provisional ballot (e.g., by receiving an input from the poll worker via the touchscreen display 202 or reading information printed on the activation card 104 by the electronic pollbook 102) and then prompt the poll worker to enter the assigned voter code via the touchscreen display 202. The voting device 200 then generates the identification code based on the voter code, as described above.

The voting device 200 includes a variety of different input and output devices that can be used to facilitate the voting process for different voters. For example, the touchscreen display 202 is configured to display the contests and associated contest choices to a voter and allow the voter to navigate through voting menus and enter his or her contest selections. The keypad 204 allows a voter to navigate through the voting menus and enter his or her contest selections as an alternative to the input capabilities of the touchscreen display 202. The keys of the keypad 204 may be embossed with Braille descriptions, may be color coded, and/or may have unique shapes to make the keypad 204 suitable for use by voters with different types of disabilities. While the keypad 204 is shown as being mounted to the housing of the voting device 200, the keypad could alternatively be provided as a separate peripheral device that is connectable to the auxiliary panel 206.

For voters who cannot use touchscreen display 202 and/or keypad 204, the voting device 200 includes an auxiliary panel 206 that provides a dual switch access port to permit the connection of a dual switch access device, such as a sip and puff device, paddle switch, floor switch, or any similar two position switching device known in the art. A voter may also connect headphones to an audio port in order to listen to an audio ballot listing the contest choices for each of the contests in the election. A blind or vision impaired voter listening to the audio ballot may use keypad 204 or any two position switching device to make his or her contest selections. The audio ballot may be played in a number of different languages for voters who do not speak the native language of the jurisdiction. The audio ballot may be generated with either speech synthesis or pre-recorded audio, for example.

After the voter confirms his or her contest selections, an internal printer (not shown) of the voting device 200 prints the contest selections on the activation card 104 to create a paper ballot 108 and, for a provisional ballot, may also generate and print the identification code, as described above.

If the voting device 200 is used only as a ballot marking device, the paper ballot 108 is discharged through the opening 208 to the voter, and the voting device 200 does not retain a record of the contest selections after the voting session has ended. The voter then inserts the paper ballot 108 into the ballot tabulation device 154 (FIG. 1B) for scanning and tabulation.

If the voting device 200 is used as a combined ballot marking device/ballot tabulation device, the voting device 200 may retain the paper ballot 108 for scanning and tabulation, in which case the voter is preferably allowed to review the paper ballot 108 through a window (not shown) of the voting device 200 and be provided with an option to accept or reject the paper ballot 108. Alternatively, the voting device 200 may discharge the paper ballot 108 through the opening 208 so that the voter can review the paper ballot 108 and, if the paper ballot 108 is acceptable, the voter re-inserts the paper ballot 108 back through the opening 208 into the voting device 200 for scanning and tabulation. The functionality of the scanning and tabulation aspect of voting device 200 will be described in greater detail below.

Figure 4:
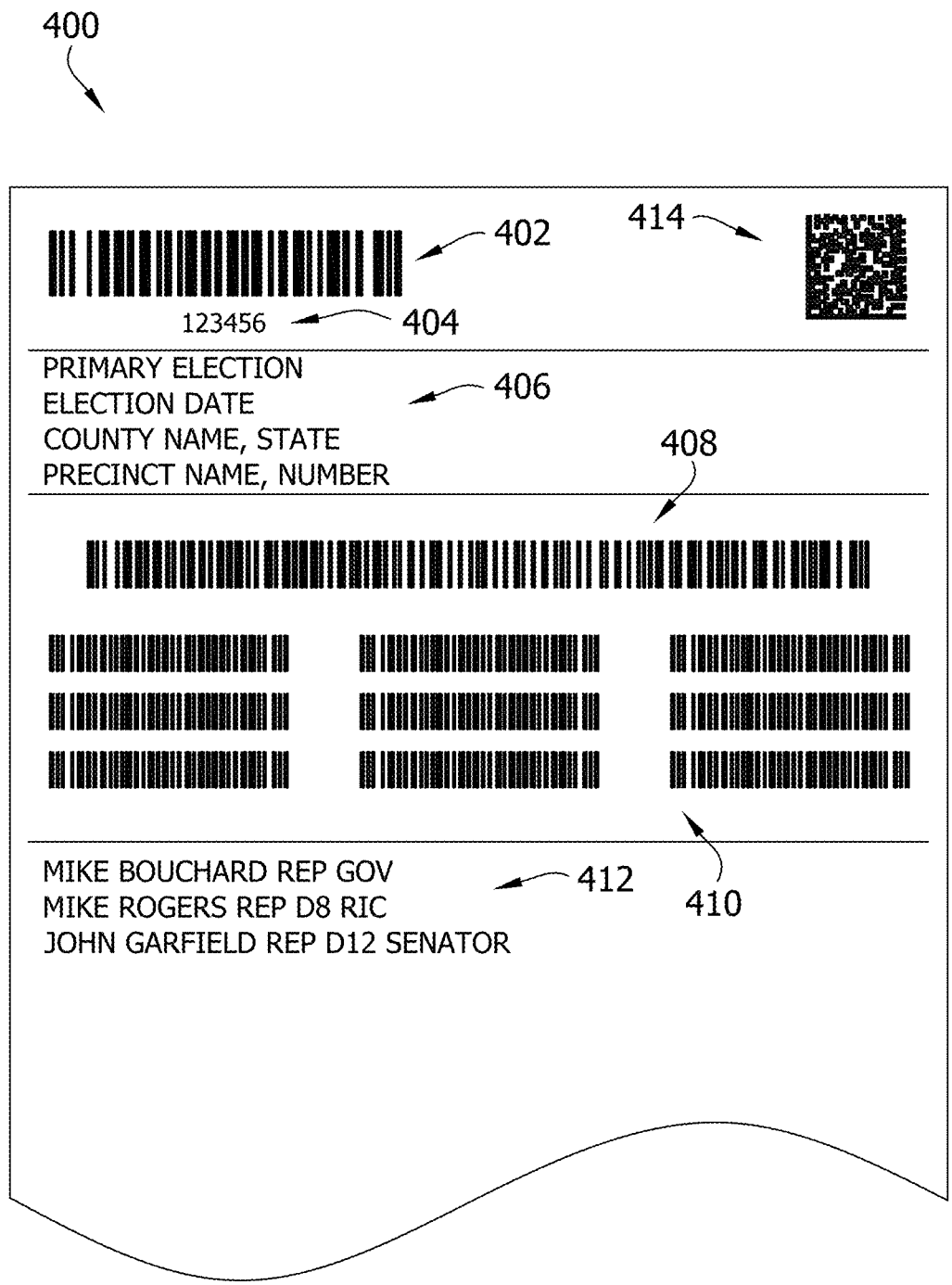
FIG. 4 illustrates a first exemplary paper ballot generated by the voting device of FIG. 2, which may be tabulated by the voting device of FIG. 2 (when operated as a ballot marking device/ballot tabulation device) or the ballot tabulation device of FIG. 3.

FIG. 4 illustrates a first exemplary paper ballot 400 that may be generated by a voting device 106 (such as the voting device 200). In this example, the paper ballot 400 includes an activation barcode 402 and verification digits 404 that were printed on the activation card 104 by the electronic pollbook 102. The activation barcode 402 encodes an election code that can be read by the voting device 200 and/or ballot tabulation device 154 to determine the appropriate ballot for the voter (i.e., the contests and contest choices applicable to that voter) based on a pre-loaded election definition. The verification digits 404 are human-readable so that a user can verify the accuracy of the activation barcode 402.

The paper ballot 400 also includes human-readable header text 406 that specifies the election name and location based on the activation barcode 402. Paper ballot 400 also includes a master barcode 408 that encodes information to enable the ballot tabulation device 154 to process the paper ballot 400. In this example, the master barcode 408 encodes a twenty-five-digit number that includes a precinct identifier (10 digits), a ballot style identifier (10 digits), the number of write—in votes (2 digits), and the total number of contest selections (3 digits). Of course, other types of information may be encoded in the master barcode 408 within the scope of the present invention. The paper ballot 400 also includes a plurality of contest selection barcodes 410, each of which encodes information representing a contest selection, as well as human-readable text identifying the contest selections 412 (e.g., name of selected candidate, party affiliation, and contest). It should be understood that the header text 406, master barcode 408, contest selection barcodes 410, and text identifying the contest selections 412, are printed by the voting device 200.

If the paper ballot 400 is a provisional ballot, the paper ballot also includes an identification code 414 that is either printed on the activation card 104 by the electronic pollbook 102 or printed by the voting device 106 (e.g., when printing the other information described above). In this example, the identification code 414 comprises a quick response code that encodes either the voter code or the encrypted voter code. Of course, other types of barcodes and machine-readable markings may also be used. In other examples, the identification code 414 may comprise either the voter code itself or the encrypted voter code, which are both human-readable and machine-readable.

As described in greater detail below, the identification code 414 (regardless of its form) identifies the paper ballot 400 as a provisional ballot and may be read by the ballot tabulation device 154 to determine the voter code or encrypted voter code for use in providing an indirect link between the voter code and CVR generated by the ballot tabulation device 154. This indirect link may then be used by the election management system 156 (FIG. 1B) to identify the CVR for each provisional ballot to be included in or excluded from the election results.

Figure 5:
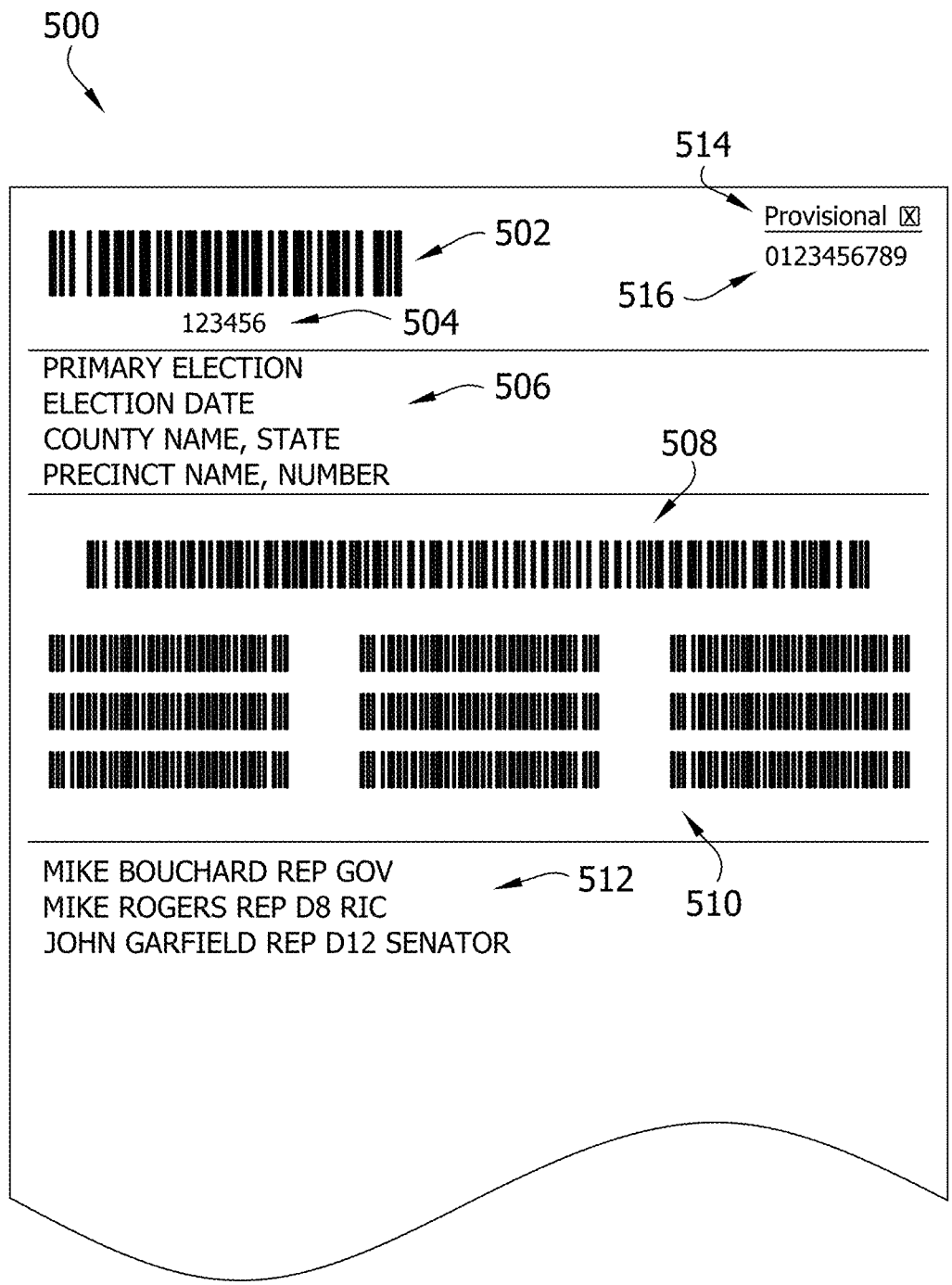
FIG. 5 illustrates a second exemplary paper ballot generated by the voting device of FIG. 2, which may be tabulated by the voting device of FIG. 2 (when operated as a ballot marking device/ballot tabulation device) or the ballot tabulation device of FIG. 3.

FIG. 5 illustrates a second exemplary paper ballot 500 that may be generated by a voting device 106 (such as the voting device 200). Paper ballot 500 is similar to paper ballot 400 and includes an activation barcode 502, verification digits 504, header text 506, a master barcode 508, a plurality of contest selection barcodes 510, and text identifying the contest selections 512. However, in this example, neither the electronic pollbook 102 nor the voting device 106 prints an identification code on the paper ballot 500. Rather, the paper ballot 500 is created from an activation card 104 having a designated provisional box 514 that is used to indicate that the ballot is a provisional ballot. The provisional box 514 is marked (e.g., by placing an X or check mark in the provisional box 514 or filling—in the provisional box 514) to indicate that the ballot is a provisional ballot, which may be done by a poll worker, the electronic pollbook 102, or the voting device 106.

When the paper ballot 500 is inserted into the ballot tabulation device 154 for scanning and tabulation, the ballot tabulation device 154 reads the marked provisional box 514 to identify the paper ballot 500 as a provisional ballot and prompts the poll worker to enter the assigned voter code (i.e., the voter code assigned by the electronic pollbook 102). The ballot tabulation device 154 then generates the identification code based on the entered voter code and prints the identification code 516 on the paper ballot 500. In this example, the identification code 516 comprises the voter code itself (i.e., 0123456789). In other examples, the identification code 516 may comprise a barcode that encodes the voter code, an encrypted voter code, or a barcode that encodes the encrypted voter code. In the latter two cases, the ballot tabulation device 154 is configured to generate the encrypted voter code using an encryption key applied to the assigned voter code. Thus, it can be appreciated that the paper ballot 500 shown in FIG. 5, with the identification code 516 printed thereon, illustrates the ballot after it has been scanned and tabulated by the ballot tabulation device 154.

Examples of suitable ballot marking devices that may be modified for use as the voting device 106 in the voting system 100 (e.g., by adding all of the functionality relating to the entry of a voter code and generation and printing of an identification code on the paper ballot 108, as applicable) are the ExpressVote® universal voting system and ExpressVote® XL full-face universal voting system, both of which are available from Election Systems & Software, LLC. It should be noted that each of these systems can be configured for use as a ballot marking device, or as a combination ballot marking device/ballot tabulation device as described herein.

It should be understood that the components of the voting system 100 described above are merely examples and that a variety of other types of electronic pollbooks (which are optional and may not be used in all embodiments), activation cards, voting devices and paper ballots may also be used within the scope of the present invention.

For example, in some embodiments, the activation card 104 comprises a full-face paper ballot that includes all of the contests and contest choices for the applicable ballot style which is pre-printed in advance of the election, and the voting device 106 comprises a ballot marking device configured to machine-mark the contest selections on the ballot. The pre-printed paper ballot may be provided to voters who hand-mark their contest selections on the ballot (e.g., using a pen to darken the appropriate mark spaces on the ballot). However, certain voters may not be able to hand-mark the paper ballot and instead insert the unmarked ballot into the voting device 106 to initiate the voting session (i.e., the unmarked ballot functions as the activation card 104). In this case, the voting device 106 scans the unmarked ballot, presents the voting choices for each contest to the voter, and prints a mark in each of the mark spaces corresponding to the voter's contest selections, i.e., the ballot is machine-marked to create the paper ballot 108. The paper ballot 108 is then discharged from the voting device 106 to the voter, and the voting device 106 does not retain a record of the contest selections after the voting session has ended. The voter then inserts the paper ballot 108 into the ballot tabulation device 154 (FIG. 1B) for scanning and tabulation, as described below.

If the paper ballot 108 comprises a provisional ballot, the voting device 106 may be configured to generate the identification code based on the voter code and print the identification code on the paper ballot 108. In one embodiment, the voting device 106 is configured to determine that the voter is casting a provisional ballot (e.g., by receiving an input from the poll worker) and then prompt the poll worker to enter the voter code assigned to the voter. As described above, the identification code printed on the paper ballot 108 may comprise the voter code itself, a barcode that encodes the voter code, an encrypted voter code, a barcode that encodes the encrypted voter code, and the like. The voting device 106 may print the identification code on the paper ballot 108 at the same time that it machine-marks the contest selections on the ballot. Of course, the identification code may alternatively be generated and printed by the ballot tabulation device 154 (FIG. 1B), as described in greater detail below.

Figure 6:
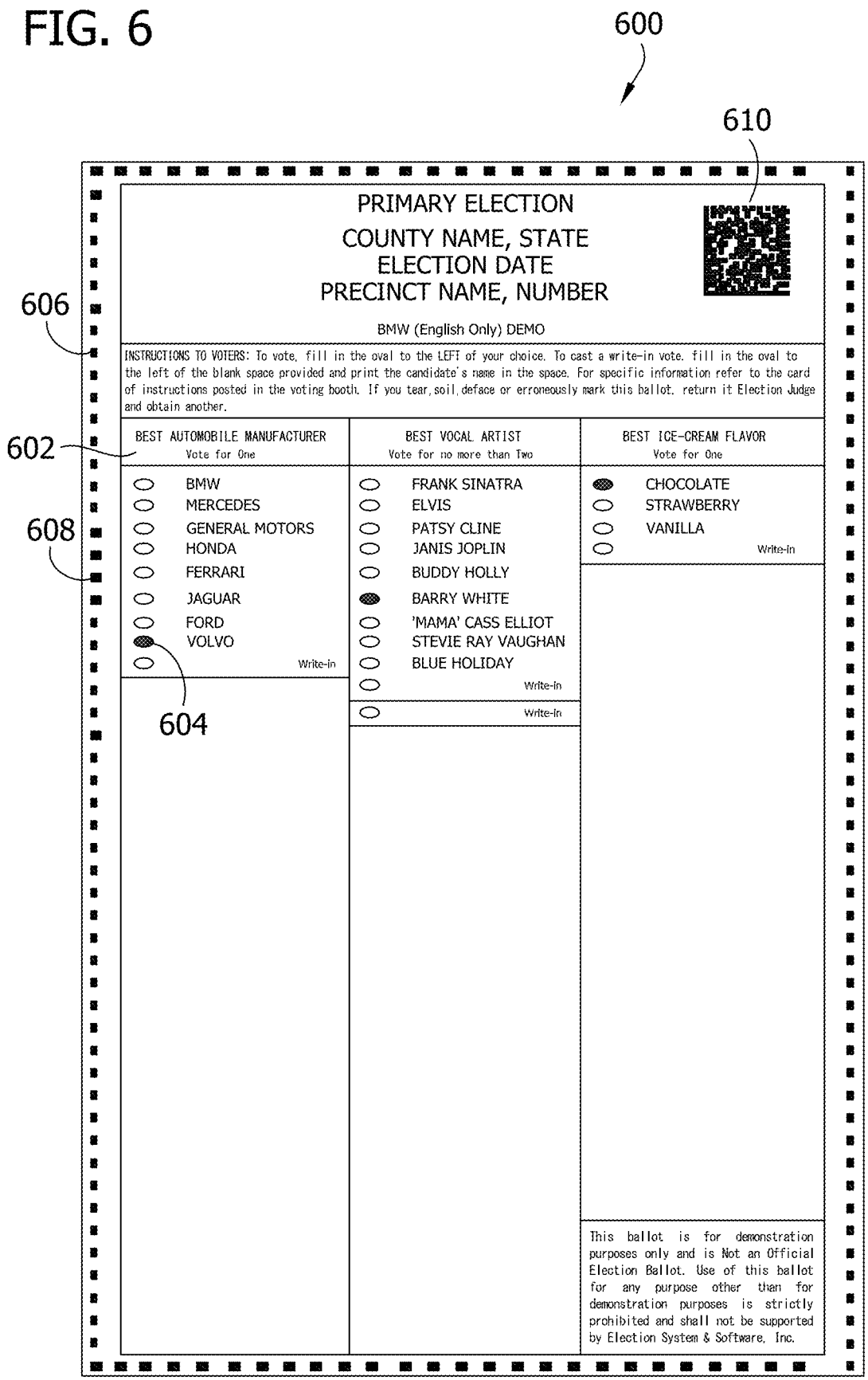
FIG. 6 illustrates a first exemplary paper ballot that may be hand-marked by a voter or machine-marked by a ballot marking device and tabulated by the ballot tabulation device of FIG. 3.

FIG. 6 illustrates a first exemplary paper ballot 600 that may be hand-marked by a voter or machine-marked by the voting device 106 (i.e., a ballot marking device). In this example, the paper ballot 600 includes printed text 602 that describe each contest (e.g., Best Automobile Manufacturer) and the names of the candidates associated with each contest (e.g., BMW, Mercedes, General Motors, Honda, Ferrari, Jaguar, Ford and Volvo). The paper ballot 600 also includes mark spaces 604 corresponding to each of the candidates in each contest. As is known in the art, a voter may darken or otherwise mark each mark space corresponding to his or her voting selection for each of the contests. Alternatively, a voter may utilize the voting device 106 (i.e., a ballot marking device) to print a mark in each of the appropriate marks spaces.

The paper ballot 600 further includes a series of timing marks 606 positioned along and down the left and right sides and across the top and bottom of the ballot. The timing marks 606 permit the ballot tabulation device 154 to determine the position (i.e., row and column) of each of the mark spaces 604 on the ballot. The paper ballot 600 further includes a plurality of code channel marks 608 positioned adjacent certain timing marks 606 on the left side of the ballot. In this example, each code channel mark 608 abuts its corresponding timing mark 606 so as to provide the appearance of a single mark. Alternatively, the code channel marks 608 may be located a distance from the timing marks 606. The code channel marks 608 are used to identify the ballot style and precinct of the paper ballot 600 so that ballot tabulation device 154 is able to associate the marked voting selections with the correct contests and candidates printed on the ballot.

If the paper ballot 600 is a provisional ballot, the paper ballot also includes an identification code 610 that may be printed on the ballot by the voting device 106. In this example, the identification code 610 comprises a quick response code that encodes either the voter code or the encrypted voter code. Of course, other types of barcodes and machine-readable markings may also be used. In other examples, the identification code 610 may comprise either the voter code itself or the encrypted voter code, which are both human-readable and machine-readable.

As described in greater detail below, the identification code 610 (regardless of its form) identifies the paper ballot 600 as a provisional ballot and may be read by the ballot tabulation device 154 to determine the voter code or encrypted voter code for use in providing an indirect link between the voter code and CVR generated by the ballot tabulation device 154. This indirect link may then be used by the election management system 156 (FIG. 1B) to identify the CVR for each provisional ballot to be included in or excluded from the election results.

FIG. 7 illustrates a second exemplary paper ballot 700 that may be hand-marked by a voter or machine-marked by the voting device 106 (i.e., a ballot marking device). The paper ballot 700 is similar to paper ballot 600 and includes the same printed text 702, mark spaces 704, timing marks 706, and code channel marks 708. However, in this example, the voting device 106 does not print an identification code on the paper ballot 700. Rather, the paper ballot 700 has a designated provisional box 710 that is used to indicate that the ballot is a provisional ballot. A poll worker may mark the provisional box 710 (e.g., by placing an X or check mark in the provisional box 710 or filling—in the provisional box 710) to indicate that the ballot is a provisional ballot.

When the paper ballot 700 is inserted into the ballot tabulation device 154 for scanning and tabulation, the ballot tabulation device 154 reads the marked provisional box 710 to identify the paper ballot 700 as a provisional ballot and prompt the poll worker to enter the assigned voter code. The ballot tabulation device 154 then generates the identification code based on the entered voter code and prints the identification code 712 on the paper ballot 700. In this example, the identification code 712 comprises the voter code itself (i.e., 0123456789). In other examples, the identification code 712 may comprise a barcode that encodes the voter code, an encrypted voter code, or a barcode that encodes the encrypted voter code. In the latter two cases, the ballot tabulation device 154 is configured to generate the encrypted voter code using an encryption key applied to the assigned voter code. Thus, it can be appreciated that the paper ballot 700 shown in FIG. 7, with the identification code 712 printed thereon, illustrates the ballot after it has been scanned and tabulated by the ballot tabulation device 154.

An example of a suitable ballot marking device that may be modified for use as the voting device 106 of voting system 100 (e.g., by adding all of the functionality relating to the entry of a voter code and generation and printing of an identification code on the paper ballot 108, as applicable) is the AutoMARK® voter assist terminal available from Election Systems & Software, LLC.

Figure 1B:
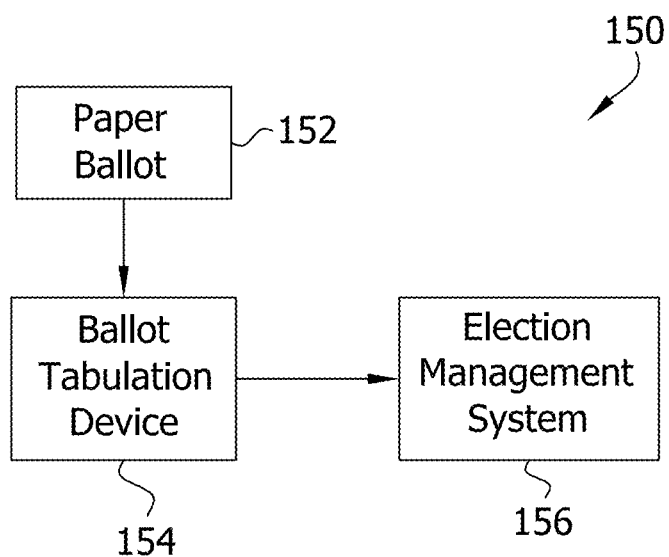
FIG. 1B is a block diagram of an exemplary voting system that includes a ballot tabulation device and an election management system in accordance with an embodiment of the invention, wherein the system may be used alone or in combination with the system of FIG. 1A.

Referring now to FIG. 1B, a voting system that may be used in some embodiments of the invention is generally indicated by reference number 150. In general terms, the voting system 150 includes a paper ballot 152 that is inserted into a ballot tabulation device 154 for scanning and tabulation, as well as an election management system 156 that is used to process the election results after the close of the election.

In some embodiments, the voting system 150 shown in FIG. 1B is used in combination with the voting system 100 shown in FIG. 1A, in which case the paper ballot 152 inserted into the ballot tabulation device 154 is the same paper ballot 108 generated by the voting device 106. For example, the paper ballot 152 may comprise the ballot 400 shown in FIG. 4, the ballot 500 shown in FIG. 5, or the ballot 600 shown in FIG. 6. In one embodiment, the ballot tabulation device 154 is a separate component from the voting device 106, in which case the ballot is discharged from the voting device 106 to the voter, and then the voter inserts the ballot into the ballot tabulation device 154 for scanning and tabulation. In another embodiment, the ballot tabulation device 154 comprises the voting device 106 (e.g., the voting device 106 functions as a ballot marking device/ballot tabulation device). In this case, the ballot may be retained by the voting device 106 for scanning and tabulation, or, the ballot may be discharged from the voting device 106 to the voter whereby the voter re-inserts the ballot back into the voting device 106 for scanning and tabulation, as described above.

In other embodiments, the voting system 150 is used independently without the voting system 100 shown in FIG. 1A. In these embodiments, the paper ballot 152 may comprise, for example, a full-face paper ballot that has been hand-marked by a voter, such as the ballot 700 shown in FIG. 7.

In some embodiments, the ballot tabulation device 154 comprises a precinct-based ballot scanner and tabulator configured to receive and scan the paper ballot 152. In one embodiment, the ballot tabulation device 154 is configured to read the machine-readable election code printed on the paper ballot 152 (e.g., the activation codes 402 and 502 printed on the ballots 400 and 500 shown in FIGS. 4 and 5, respectively) to determine the appropriate ballot style based on the pre-loaded election definition. In another embodiment, the ballot tabulation device 154 is configured to read the code channel marks printed on the paper ballot 152 (e.g., the code channel marks 608 and 708 printed on the ballots 600 and 700 shown in FIGS. 6 and 7, respectively) to determine the appropriate ballot style based on the pre-loaded election definition.

The ballot tabulation device 154 is also configured to read the paper ballot 152 to determine the contest selections marked or printed thereon. In one embodiment, the ballot tabulation device 154 is configured to read the contest selection barcodes printed on the paper ballot 152 (e.g., the contest selection barcodes 410 and 510 printed on the ballots 400 and 500 shown in FIGS. 4 and 5, respectively) to determine the contest selections made by the voter. In another embodiment, the ballot tabulation device 154 is configured to use the timing marks printed on the paper ballot 152 (e.g., the timing marks 606 and 706 printed on the ballots 600 and 700 shown in FIGS. 6 and 7, respectively) to locate the mark spaces printed on the paper ballot 152 (e.g., the mark spaces 604 and 704 printed on the ballots 600 and 700 shown in FIGS. 6 and 7, respectively). Then, the ballot tabulation device 154 uses a mark recognition scheme to determine whether each of the mark spaces was marked and thereby determine the contest selections made by the voter. The contest selections are then stored in a cast vote record (CVR) for the paper ballot 152.

The ballot tabulation device 154 is also configured to determine if the paper ballot 152 is a provisional ballot and, if so, provide a link between the voter code for the provisional ballot and the CVR generated by the ballot tabulation device 154, as described herein.

In some embodiments, the ballot tabulation device 154 is configured to read the identification code printed on the paper ballot 152 (e.g., the identification codes 414 and 610 printed on the ballots 400 and 600 shown in FIGS. 4 and 6, respectively) and then use the voter code or encrypted voter code to provide the link between the voter code and the CVR for the provisional ballot.

In other embodiments, the ballot tabulation device 154 is configured to read the provisional box printed on the paper ballot 152 (e.g., the provisional boxes 514 and 710 printed on the ballots 500 and 700 shown in FIGS. 5 and 7, respectively) to determine if the paper ballot 152 is a provisional ballot. If so, the ballot tabulation device 154 prompts the poll worker to enter the assigned voter code. The ballot tabulation device 154 generates the identification code associated with or based on the entered voter code and prints the identification code on the paper ballot 152 (e.g., the identification codes 516 and 712 printed on the ballots 500 and 700 shown in FIGS. 5 and 7, respectively). As described herein, the identification code printed on the paper ballot may comprise the voter code itself, a barcode that encodes the voter code, an encrypted voter code, or a barcode that encodes the encrypted voter code. The identification code printed on the paper ballot may also comprise a ballot code, in which case the ballot tabulation device 154 creates a cross-reference table that associates the voter code with the ballot code. The ballot tabulation device 154 then uses the voter code or encrypted voter code to provide the link between the voter code and the CVR for the provisional ballot, as described herein.

The ballot tabulation device 154 has been described above as having the capability of reading various type of information from the paper ballot 152. In most embodiments, the ballot tabulation device 152 is configured to capture an image of the paper ballot 152 and store that image with the CVR for the paper ballot 152. In these embodiments, the ballot tabulation device 154 will typically read the information from the image of the paper ballot 152 (not from the paper ballot 152 itself). Thus, it should be understood that any references in the present disclosure to reading information from a paper ballot includes both reading the information from the physical ballot and reading the information from an image of the paper ballot.

Once the paper ballot 152 has been fully processed, the ballot tabulation device 154 discharges the ballot into an attached ballot receptacle for storage along with the ballots of other voters.

When the polls are closed, the ballot tabulation device 154 is configured to create a summary of the election results, i.e., the total vote count for all of the CVRs stored on the ballot tabulation device 154. The inclusion of the CVRs for provisional ballots in the total vote count will be dependent on the jurisdiction. For example, in some jurisdictions, all of the provisional ballots cast during an early voting/in-person absentee voting period are included in the total vote count. Also, in some jurisdictions, all of the provisional ballots cast on the day of the election are not included in the total vote count. Preferably, the ballot tabulation device 154 includes the eligibility status (indicating whether the contest selections were counted or not) within the CVR for each provisional ballot.

If the poll is an election day poll, the ballot tabulation device 154 may also be configured to print a summary tape showing the election results. If the poll is an early voting/ in-person absentee poll, the printed tape typically only shows the number of ballots cast in each precinct at the poll.

The ballot tabulation device 154 is also configured to store a variety of information on a storage medium (e.g., a removable storage device such as a USB flash drive, a memory card, and the like). The information stored on the storage medium may comprise, for example, the summary of the election results, all of the CVRs (including the eligibility status for each provisional ballot), and the link between the CVR and voter code for each provisional ballot. In embodiments in which the ballot code functions as the identification code, the link between the ballot code and voter code for each provisional ballot may also be stored on the storage medium. In embodiments in which the identification code comprises an encrypted voter code or a barcode that encodes an encrypted voter code, the encryption key used to encrypt the voter codes or a decryption key that may be used to decrypt the encrypted voter codes may also be stored on the storage medium. All of the information stored on the storage medium may be encrypted for security purposes. Finally, the storage medium is taken to a central site for processing, as described below.

Figure 3:
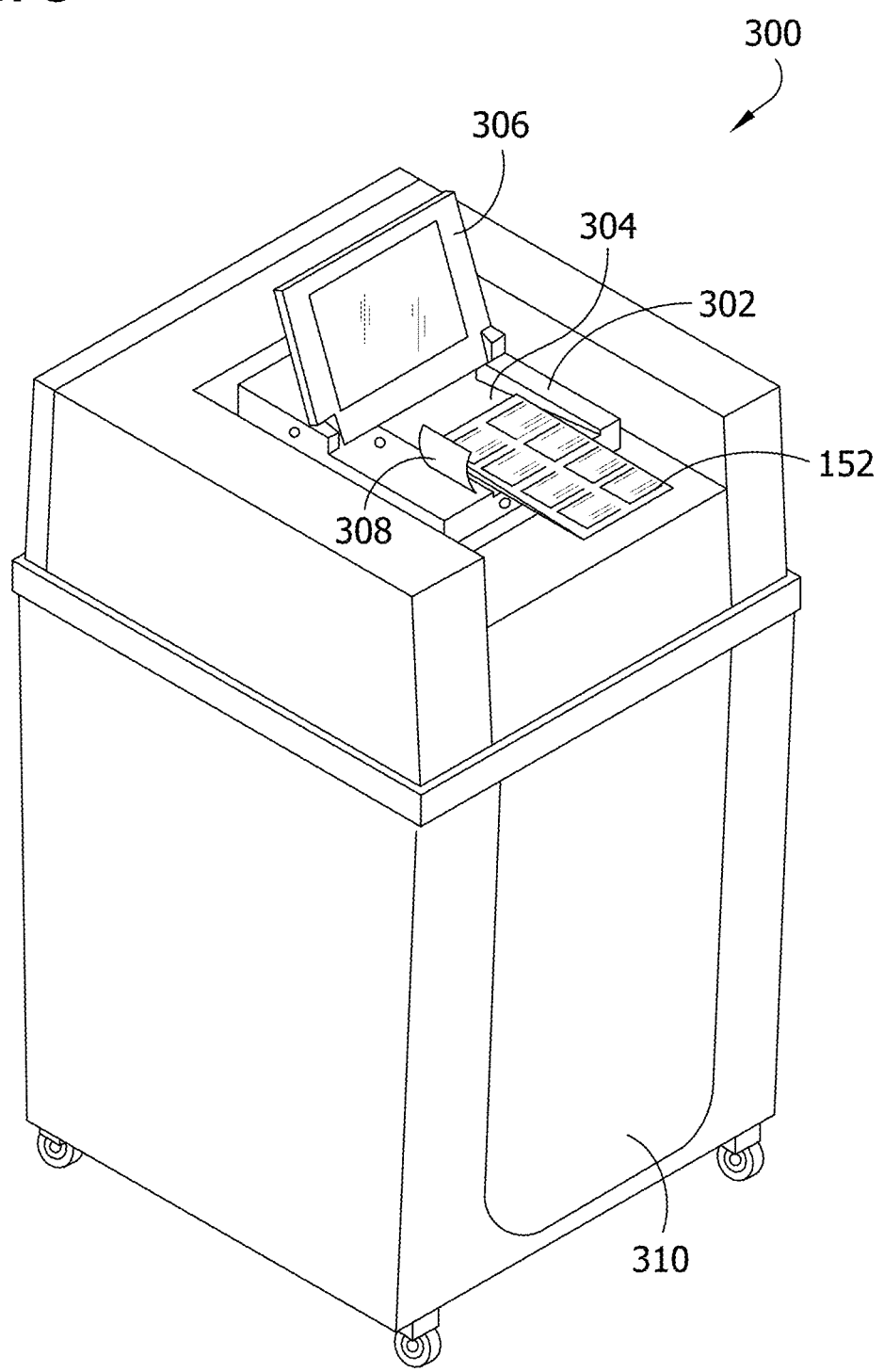
FIG. 3 is a perspective view of an exemplary ballot tabulation device that may be used in the voting system of FIG. 1B.

Referring to FIG. 3, an exemplary embodiment of the ballot tabulation device 154 is generally indicated by reference number 300. Ballot tabulation device 300 generally includes a protective housing 302 with various internal components known in the art, a ballot insertion tray 304, a display 306, and a report printer 308, as described below. Ballot tabulation device 300 may also include an imprinter (not shown) that prints an identification code on the paper ballot 152 (i.e., in embodiments where the identification code was not printed by the electronic pollbook 102 or the voting device 106).

The ballot insertion tray 304 is configured to receive a paper ballot 152 for scanning and tabulation. The ballot insertion tray 304 is preferably molded into the front cover section of the protective housing 302 and is sized to accommodate a particular ballot size. An additional tray insert (not shown) having reversible paper guides may be mounted into the ballot insertion tray 304 to accommodate two different ballot sizes. For example, when the paper guides are oriented down, the ballot insertion tray 304 may accommodate an 8.5-inch-wide standard-size ballot, such as the ballots 600 and 700 shown in FIGS. 6 and 7, respectively. When the paper guides are oriented up, the ballot insertion tray 304 may accommodate a 4.25-inch-wide ballot, such as the ballots 400 and 500 shown in FIGS. 4 and 5, respectively. Of course, other size ballots may also be received within the ballot insertion tray 304 within the scope of the present invention.

The display 306 is preferably an LCD touchscreen display configured to provide a voter interface used to communicate information associated with a scanned paper ballot to the voter (e.g., information regarding ballot irregularities such as over votes, under votes, and blank ballots) and receive voter feedback. The display 306 is connected to the upper portion of the ballot tabulation device 300 by two hinges, one located on each side of the display, which enable the display 306 to open up during use or fold down flat during storage. Of course, other types of displays and input devices are also possible and within the scope of the present invention.

The report printer 308 is an internal printer for device level and polling place level reporting, including the printing of reports at poll opening and poll closing, included the summary reports described herein. The report printer 308 is capable of printing on paper that is approximately 3 inches wide and is of the drop—in roll paper type. As shown in FIG. 3, the paper passes through an aperture in the protective housing 302 such that it is easily accessible by users. It should be noted that the report printer 308 is typically a different component than the imprinter used to print an identification code on the paper ballot 152. It should be understood that the report printer may comprise an external printer in other embodiments.

As shown in FIG. 3, the ballot tabulation device 300 mounts onto the top of a ballot receptacle 310. The base of the ballot tabulation device 300 includes four mounting feet (not shown) that provide airflow under the unit and allow it to be securely inserted into a recessed area of the ballot receptacle 310. In this embodiment, the ballot tabulation device 300 slides onto mounting rails (not shown) located on top of the ballot receptacle 310. The ballot receptacle 310 is preferably made of steel or a durable plastic material for security purposes. In operation, scanned and tabulated ballots are deposited directly into the ballot receptacle 310. Of course, the ballot receptacle 310 may have other configurations as are well known to one skilled in the art.

Examples of suitable ballot tabulation devices that may be modified for use as the ballot tabulation device 154 in the voting system 150 (e.g., by adding all of the functionality relating to the entry of a voter code and generation and printing of an identification code on the paper ballot 152, as applicable) are the DS200® precinct scanner and tabulator, the DS450® central scanner and tabulator, and the DS850® central scanner and tabulator, all of which are available from Election Systems & Software, LLC.

Referring again to FIG. 1B, the election management system 156 comprises a computer system (i.e., election management software executed on a computing device) that is configured to read the information from the storage medium for the ballot tabulation device 154 and upload the information to an election management system (EMS) database. As described above, the information stored on the storage medium may comprise, for example, the summary of the election results, all of the CVRs (including the eligibility status for each provisional ballot), the link between the CVR and voter code for each provisional ballot, and, in some embodiments, the link between the ballot code and voter code for each provisional ballot (in embodiments where the ballot code functions as the identification code) and/or the encryption key needed for voter code encryption or the decryption key needed for voter code decryption (in embodiments where the identification code comprises an encrypted voter code or a barcode that encodes an encrypted voter code). In some embodiments, the election management system 156 segregates all of the CVRs for provisional ballots within the EMS database.

In some embodiments, each voter on the list of voters who has been assigned a voter code is reviewed to determine if the eligibility status of the voter and associated provisional ballot has changed. For example, if a voter who cast a ballot during an early voting/in-person absentee voting period also casts a vote on election day, that voter's eligibility status may change from eligible to ineligible for the provisional ballot (assuming that the eligibility status was originally eligible). As another example, if a voter who cast a provisional ballot on election day is later determined to be an eligible voter, that voter's eligibility status may change from ineligible to eligible for the provisional ballot (assuming that the eligibility status was originally ineligible). As a result of the eligibility review, a list of voter codes whose eligibility status needs to change is created.

The election management system 156 is configured to receive an input comprising a list of voter codes and the eligibility determination for each voter on the list. The election management system 156 is also configured to access the EMS database to identify the CVR associated with each voter code on the list using the link between the CVR and voter code for each provisional ballot.

In some embodiments, the identification code printed on the provisional ballot comprises the voter code itself or a machine-readable barcode that encodes the voter code. In these embodiments, the link between the voter code and the CVR may comprise a cross-reference table that associates the voter code with the CVR identifier. The election management system 156 is configured to access the cross-reference table to identify the CVR associated each voter code on the list. If the voter code is directly linked to the CVR, the election management system is configured to prevent a user from accessing the contest selections stored in the CVR for the provisional ballot based on the voter code.

In other embodiments, the identification code printed on the provisional ballot comprises an encrypted voter code or a machine-readable barcode that encodes the encrypted voter code. In these embodiments, there are a number of different ways in which the election management system 156 may identify the CVR associated with each voter code on the list.

In one embodiment, the link between the voter code and the CVR is a cross-reference table that associates the encrypted voter code with the CVR identifier. The election management system 156 is configured to encrypt each voter code on the list using the same encryption key (i.e., the encryption key used to generate the identification codes) and then access the cross-reference table to identify the CVR associated each voter code on the list.

In another embodiment, the link between the voter code and the CVR is the encrypted voter code stored within the CVR for the provisional ballot. The election management system 156 is configured to encrypt each voter code on the list using the encryption key used to generate the identification codes, and then identify the CVR that stores the voter code as encrypted for each voter code on the list. The encryption key may be known to the election management system 156 or, alternatively, stored on the storage medium of the ballot tabulation device and uploaded to the election management system 156 in a protection manner.

In yet another embodiment, the link between the voter code and the CVR is the encrypted voter code stored within the CVR for the provisional ballot (i.e., the same type of link as the previous embodiment). However, in this embodiment, the election management system 156 is configured to decrypt the encrypted voter code stored within the CVR of each provisional ballot using a decryption key, and then identify the CVR corresponding to each voter code on the list. The decryption key may be known to the election management system 156 or, alternatively, stored on the storage medium of the ballot tabulation device and uploaded to the election management system 156 in a protected manner.

The election management system 156 is also configured to update the total vote count so that the contest selections stored within the CVR for each voter code on the list are included in the total vote count when the eligibility determination indicates the voter associated with the inputted voter code is an eligible voter. Likewise, the election management system 156 is configured to update the total vote count so that the contest selections stored within the CVR for each voter code on the list are excluded from the total vote count when the eligibility determination indicates the voter associated with the inputted voter code is an ineligible voter. Finally, the election management system 156 is configured to change the eligibility status within the CVR for each voter code on the list.

Preferably, the operator inputting the list of voter codes into the election management system 156 does not have access to the paper ballots 152 so as to prevent the operator from associating a voter with a particular physical ballot. Also, the election management system 156 is preferably configured to prevent an operator from associating a voter code on the list with the contest selections in a particular CVR. Rather, the election management system uses an indirect link between the voter code and CVR, or, the voter code is stored in a restricted field of the CVR (assuming that an operator does not have access to that restricted field).

It should be understood that the election management system 156 is merely an example and that other election management systems may also be used within the scope of the invention. For example, while the election management system 156 is configured to process a list of voter codes whose eligibility status needs to change, other systems could be configured to process all of the voter codes for provisional ballots—regardless of whether the eligibility status needs to change or not. Other variations will be apparent to one skilled in the art.

An example of suitable election management software that may be modified for use on a computing device to provide the election management system 156 of voting system 150 is the Electionware® election management software available from Election Systems & Software, LLC.

B. Voting Methods

Figure 8:
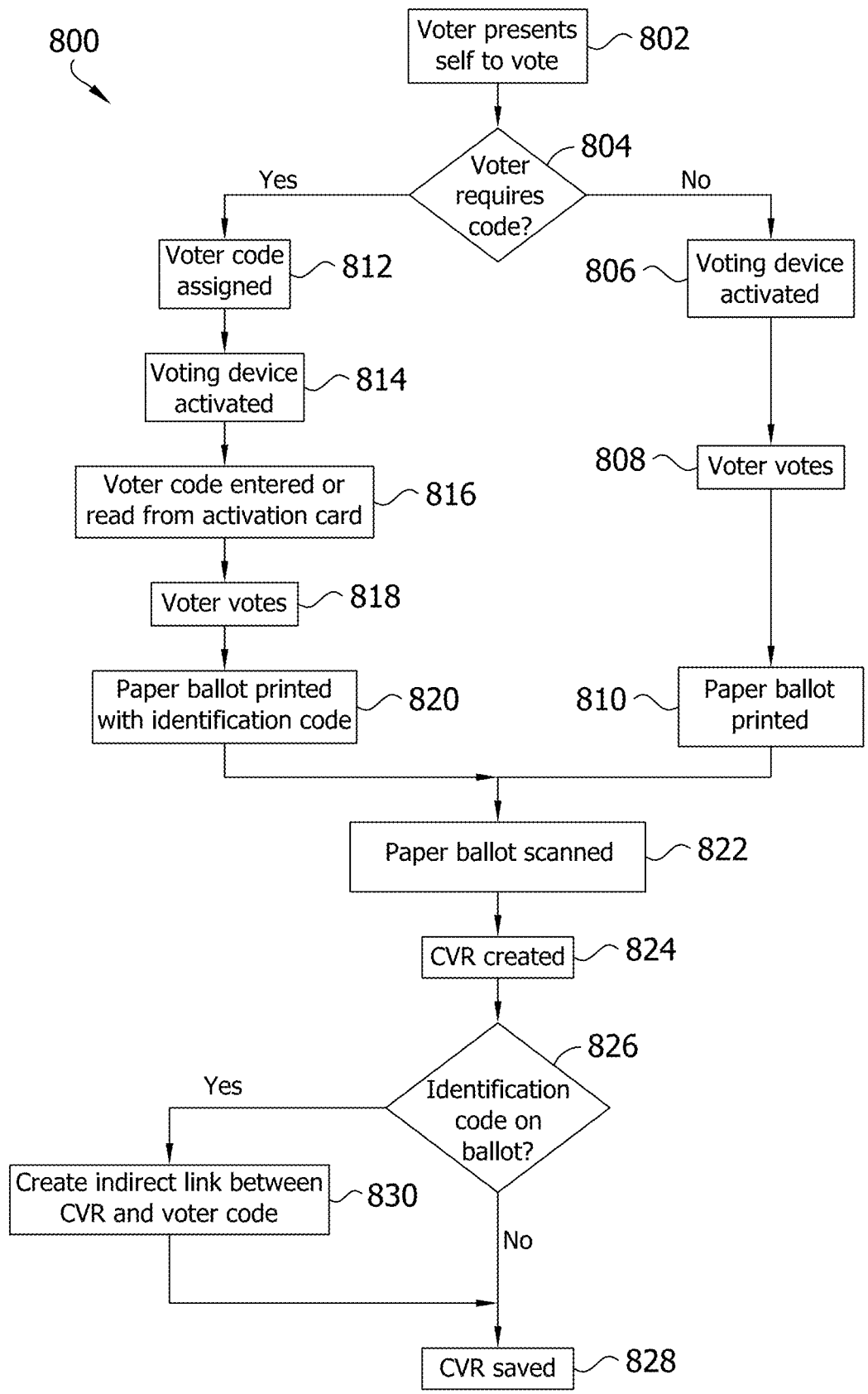
FIG. 8 is a flow diagram of a ballot casting and tabulation method in accordance with an embodiment of the invention.

Referring to FIG. 8, a ballot casting and tabulation method in accordance with an embodiment of the invention is generally indicated by reference numeral 800. In step 802, a voter arrives at the polling location and checks in with a poll worker. In step 804, it is determined whether the voter requires a voter code (e.g., if the voter is voting a provisional ballot). If the voter does not require a voter code, in step 806, the voter or a poll worker activates a voting device, and then the voter uses the voting device to enter his or her contest selections in step 808. In step 810, the voting device prints a paper ballot that includes the contest selections marked thereon.

If the voter does require a voter code, then a voter code is assigned to the voter in step 812. In step 814, the voter or a poll worker activates a voting device. In step 816, the voting device reads the identification code from an activation card used to activate the voting device, or, the voter code is entered into the voting device whereby the voting device generates an identification code based on the voter code. The voter then uses the voting device to enter his or her contest selections in step 818. In step 820, the voting device prints a paper ballot that includes the contest selections marked thereon along with the activation code.

In step 822, the paper ballot printed by the voting device is scanned by a ballot tabulation device and, in step, 824, a CVR is created that contains the contest selections marked on the ballot. In step 826, it is determined whether the paper ballot includes an identification code. If not, then the ballot tabulation device saves the CVR in step 828 and the voting process ends. However, if the paper ballot includes an identification code, then the ballot tabulation device creates a link between the CVR and the voter code in step 830 (as described above), which may be used by the election management system to identify the CVR associated with a particular voter code. The ballot tabulation device then saves the CVR (and the indirect link) in step 828 and the voting process ends.

Figure 9:
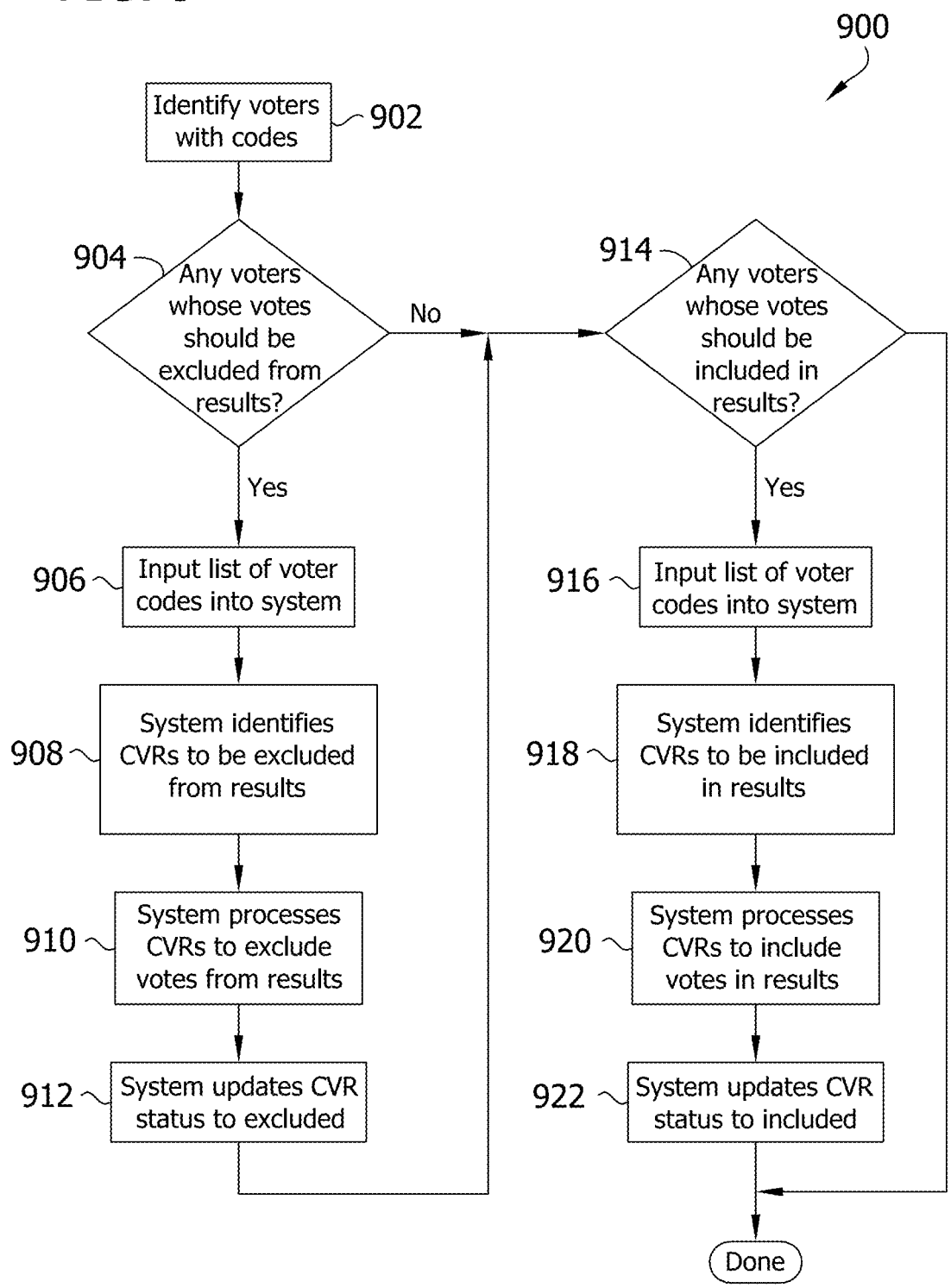
FIG. 9 is a flow diagram of a provisional ballot adjudication method that may be performed after the close of the election in accordance with an embodiment of the invention.

Referring to FIG. 9, a post-election method for adjudicating provisional ballots in accordance with an embodiment of the invention is generally indicated by reference numeral 900. In step 902, the voters who have been assigned voter codes are identified. In step 904, it is determined whether there are any voters whose contests selections should be excluded from the election results, e.g., a voter whose contest selections were included in the initial election results but it has been determined that the voter was ineligible to vote in the election. If so, a list of the voter codes assigned to such ineligible voters are input into the system in step 906. In step 908, the system identifies the CVR associated with each voter code using the link between the CVR and the voter code. In step 910, the system identifies the contests selections within each identified CVR and updates the total vote count to exclude those contest selections. Then, in step 912, the system updates the eligibility status of the CVR to indicate that the contest selections have been excluded from the election results.

In step 914, it is determined whether there are any voters whose contests selections should be included in the election results, e.g., a voter whose contest selections were excluded from the initial election results but it has been determined that the voter was eligible to vote in the election. If so, a list of the voter codes assigned to such eligible voters are input into the system in step 916. In step 918, the system identifies the CVR associated with each voter code using the link between the CVR and the voter code. In step 920, the system identifies the contests selections within each identified CVR and updates the total vote count to include those contest selections. Then, in step 922, the system updates the eligibility status of the CVR to indicate that the contest selections have been included in the election results.

Figure 10A:
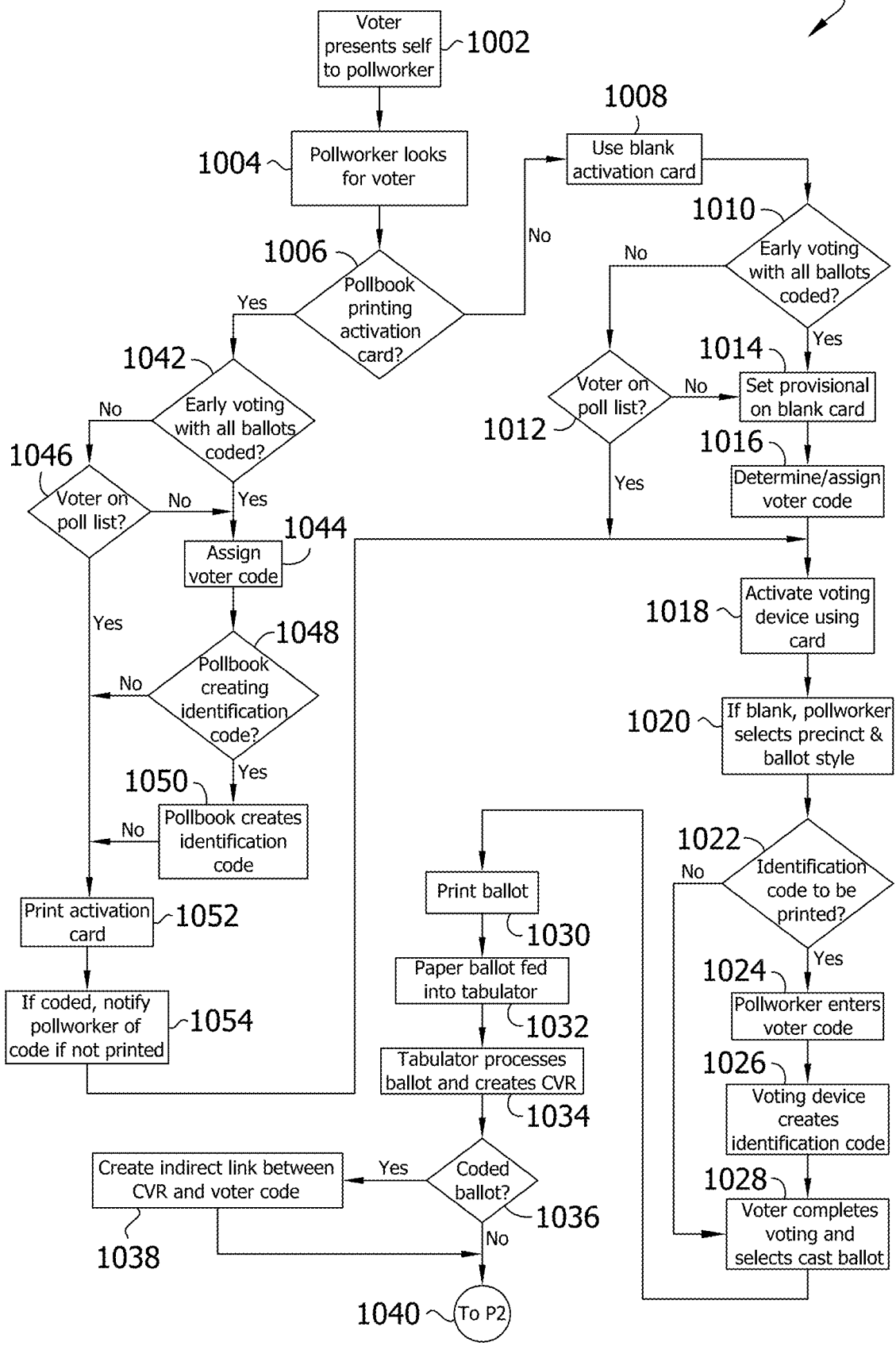
FIGS. 10A and 10B are flow diagrams of (i) a ballot casting and tabulation method that may be used to process paper ballots that are printed or machine-marked by a voting device and (ii) a provisional ballot adjudication method that may be performed after the close of the election, in accordance with an embodiment of the invention.
Figure 10B:
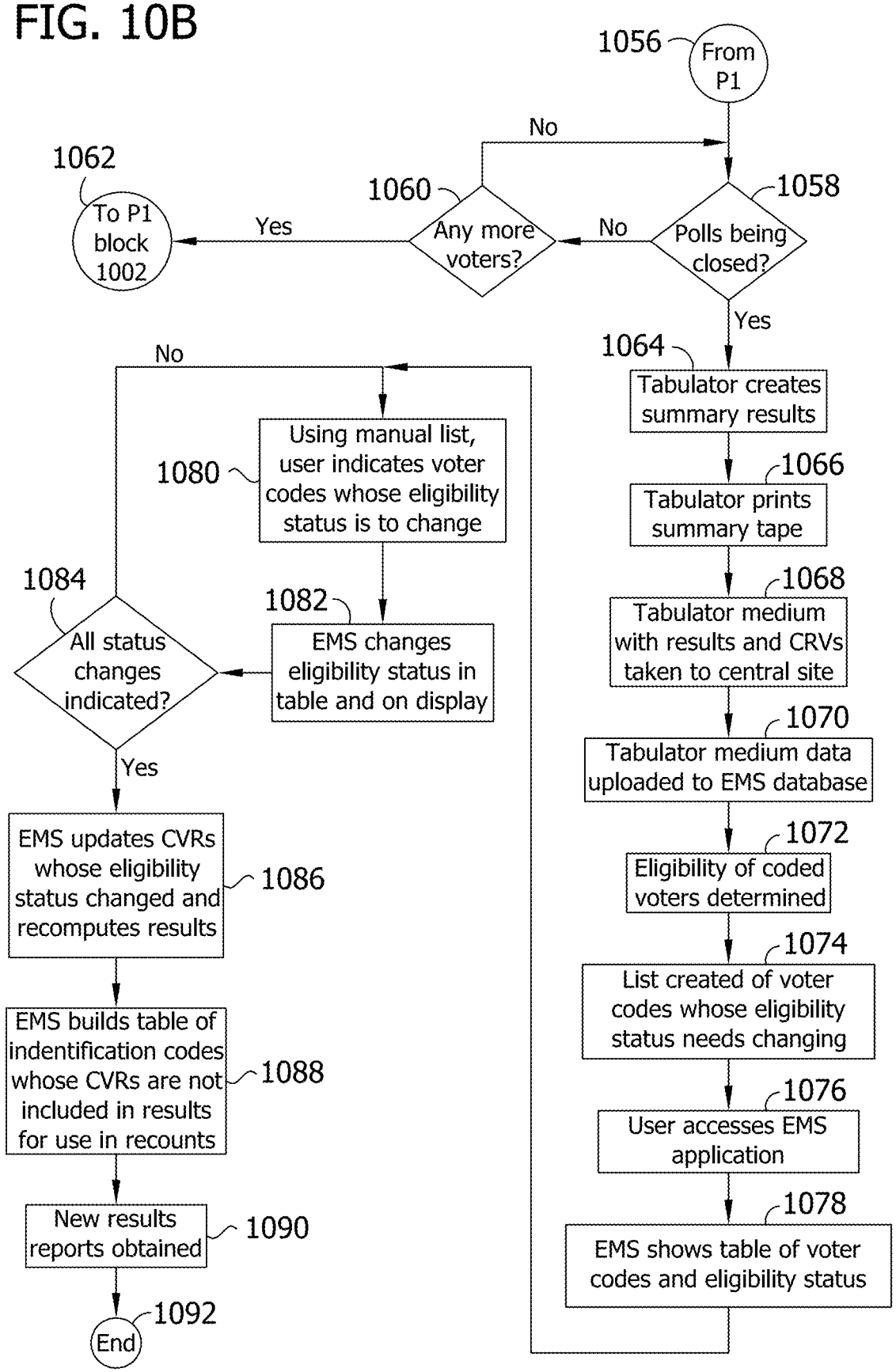

Referring to FIGS. 10A and 10B, a ballot casting and tabulation method to be used with paper ballots that are printed or marked by a voting device (FIG. 10A) and a method for adjudicating provisional ballots after the close of the election (FIG. 10B) in accordance with an embodiment of the invention is generally indicated by reference numeral 1000.

In step 1002, a voter arrives at the polling location and checks in with a poll worker to establish his or her entitlement to vote. In step 1004, the poll worker uses a pollbook (either an electronic pollbook or physical pollbook) to check in the voter by attempting to find the voter in the voter registration records. If the voter is located, the ballot style and voting precinct for the voter will be established. In step 1006, it is determined whether an electronic pollbook is being used to print an activation card for the voter. If so, the "yes" path is taken to step 1042 (described below). If not, the "no" path is taken to step 1008.

In step 1008, a blank activation card is selected for use in activating a voting device. The blank activation card may comprise, for example, a blank card on which a summary of the contest selections will be printed or a blank preprinted full-face ballot on which the contest selections will be marked. In step 1010, it is determined whether the voter is voting during an early voting/in-person absentee voting period in which the jurisdiction assigns voter codes to every voter. If so, the "yes" path is taken to step 1014, indicating that the voter will be assigned a voter code to cast a provisional ballot. Otherwise, for example, if the voter is voting on election day or if the voter is voting during an early voting/in-person absentee voting period but the jurisdiction does not assign voter codes to every voter, the "no" path is taken to step 1012. It should be understood that each jurisdiction conducting an election has its own rules governing whether the jurisdiction assigns voter codes to all voters during an early voting/in-person absentee voting session.

If the "no" path is taken to step 1012, a determination is made on whether the voter was located in the voter registration records, which will allow the voter's precinct and ballot style to be determined. In addition, even if the voter was located in the voter registration records, a determination is made on whether there is some other challenge to the voter's eligibility to vote in the current election. If the voter is not located in the voter registration records and/or the voter's eligibility to vote is being challenged, the "no" path is taken to step 1014, indicating that the voter will be assigned a voter code to cast a provisional ballot. If the voter is located in the voter registration records and the voter's eligibility to vote is not being challenged, the "yes" path is taken to step 1018, indicating that the voter will be casting a normal ballot to be included in the results of the election.

Reaching step 1014 indicates that the voter will be assigned a voter code to cast a provisional ballot. In step 1014, a provisional box is marked on the activation card and, in step 1016, a voter code is assigned to the voter. This can be done automatically by an electronic pollbook or manually by a poll worker (e.g., the poll worker selects the voter code from a preprinted list of voter codes and places a preprinted sticker on the activation card, as well as marks the provisional box on the activation card). Regardless of the manner in which the voter code is assigned to the voter, a record (which may be electronic or physical) is kept indicating which voter code was assigned to the voter so that the voter code can be matched to the voter at a later time. This record may be stored by an electronic pollbook or retained on a manual list.

In step 1018, the voter is ready to use the voting device to make his or her contest selections, and the activation card is inserted into the voting device to initiate the voting session. The activation card may be a blank card (as described above) or one printed by an electronic pollbook (as described below). If the activation card was printed by an electronic pollbook, the activation card will have a code printed on it that identifies the precinct of the voter and the ballot style that the voter is entitled to vote. In this case, the voting device reads the code and automatically selects the corresponding precinct and ballot style for the voter, and the path is taken directly to step 1022 (skipping step 1020). However, in step 1020, if the activation card is blank, the poll worker selects the voter's precinct (if there is more than one precinct at the polling location) and/or the ballot style that the voter is entitled to vote (if there is more than one ballot style for the precinct). Of course, if there is only one precinct and only one ballot style assigned to the precinct, the poll worker selection is not required and the voting device automatically selects the precinct and ballot style for the voter.

In step 1022, the voting device determines whether an identification code based on the voter code needs to be printed on the activation card. For example, if the voter does not require a voter code or if the activation card already includes an identification code, then the "no" path is taken to step 1028. However, if the voter has been assigned a voter code (e.g., a challenged election day voter or an early voting/in-person absentee voter) but the activation card does not include the identification code, then the "yes" path is taken to step 1024.

In step 1024, the voting device reads the marked provisional box on the activation card and prompts the poll worker to enter the voter code assigned to the voter into the voting device. Alternatively, the voting device may automatically select the next available voter code from a pre-established list of voter codes or generate a random voter code. If the activation card does not include a provisional box, then the process may vary depending on whether the voter is voting during an early voting/in-person absentee voting period or on election day. If the former, the voting device may prompt the poll worker to enter the voter code assigned to the voter into the voting device. If the latter, the poll worker will enter an input into the voting device (e.g., press a button) to indicate that this voter is casting a provisional ballot, which will prompt the voting device to allow the poll worker to enter the voter code assigned to the voter. In step 1026, after the voting device receives the voter code, the voting device creates the identification code based on the voter code, as described herein. Of course, steps 1024 and 1026 may alternatively be performed by a ballot tabulation device, as described below.

In step 1028, the voting device presents the contests and associated contest choices to the voter, and the voter enters his or her contest selections into the voting device. Once all of the contest selections have been entered and reviewed for accuracy, the voter selects the option to print the ballot. In step 1030, the voting device prints the contest selections on the activation card, as well as any identification code that was generated by the voting device, to thereby generate a paper ballot. It should be noted that once the contests selections are printed on the activation card, the activation card (which is now a paper ballot) can no longer be used as an activation card to initiate a voting session on the voting device. If the paper ballot is inserted back into the voting device, the voting device will only read the paper ballot and display a summary of the contest selections printed on the ballot.

In step 1032, the paper ballot is inserted into a ballot tabulation device for scanning and tabulation. In some embodiments, the voting device ejects or discharges the paper ballot to the voter, and the voter or a poll worker inserts the ballot into a separate ballot tabulation device. In other embodiments, the voting device is a ballot marking device/ballot tabulation device. In one embodiment, the voting device ejects or discharges the paper ballot to the voter for review, and the voter re-inserts the ballot back into the voting device. In another embodiment, the voting device does not eject or discharge the paper ballot to the voter; rather, the voter is allowed to review the paper ballot through a window of the voting device and the voter is provided with an option to accept or reject the ballot. If the voter accepts the ballot, the paper ballot is retained by the voting device for scanning and tabulation.

In step 1034, the ballot tabulation device scans the paper ballot, determines the contest selections marked on the paper ballot, and creates a CVR to store the contest selections. If the paper ballot comprises a full-face paper ballot, the ballot tabulation device may read the code channel and timing marks on the ballot to determine the marked voting selections, as described herein.

In step 1036, it is determined whether the paper ballot includes an identification code or a marked provisional box, which may be done simultaneously with the scanning of the ballot. If not, the "no" path is taken to step 1040 where the ballot casting process for this voter is now complete. Otherwise, the "yes" path is taken to step 1038.

In step 1038, the ballot tabulation device reads the identification code if the code has previously been printed on the paper ballot by an electronic pollbook or the voting device. In this case, the ballot tabulation device determines the voter code from the identification code, which may require decoding a barcode to determine the voter code or encrypted voter code and/or decrypting an encrypted barcode (depending on the type of identification code that has been used). If the paper ballot includes a marked provisional box but there is no identification code, the ballot tabulation device will prompt the poll worker to enter the voter code assigned to the voter into the device. Alternatively, the ballot tabulation device may automatically select the next available voter code from a pre-established list of voter codes or generate a random voter code. After receipt of the voter code, the ballot tabulation device creates the identification code based on the voter code. In either case, the ballot tabulation device creates a link between the voter code and CVR for the provisional ballot, as described herein, which may be used by the election management system to identify the CVR associated with a particular voter code. The process then proceeds to step 1040 where the ballot casting process for this voter is now complete.

Referring back to step 1006, if it is determined that an electronic pollbook is being used to print the activation card for the voter, then the "yes" path is taken to step 1042. In step 1042, it is determined whether the voter is voting during an early voting/in-person absentee voting period in which the jurisdiction assigns voter codes to every voter. If so, the "yes" path is taken to step 1044, indicating that the voter will be assigned a voter code to cast a provisional ballot. Otherwise, for example, if the voter is voting on election day or if the voter is voting during an early voting/in-person absentee voting period but the jurisdiction does not assign voter codes to every voter, the "no" path is taken to step 1046.

If the "no" path is taken to step 1046, a determination is made on whether the voter was located in the voter registration records, which will allow the voter's precinct and ballot style to be determined. In addition, even if the voter was located in the voter registration records, a determination is made on whether there is some other challenge to the voter's eligibility to vote in the current election. If the voter is not located in the voter registration records and/or the voter's eligibility to vote is being challenged, the "no" path is taken to step 1044, indicating that the voter will be assigned a voter code to cast a provisional ballot. If the voter is located in the voter registration records and the voter's eligibility to vote is not being challenged, the "yes" path is taken to step 1052, indicating that the voter will be casting a normal ballot to be included in the results of the election.

It can be appreciated that step 1044 is reached if (i) the voter is voting during an early voting/in-person absentee voting period in which the jurisdiction assigns voter codes to every voter or (ii) the voter is not located in the voter registration records and/or the voter's eligibility to vote is being challenged. In step 1044, a voter code is assigned to the voter. This can be done automatically by the electronic pollbook or manually by a poll worker. Regardless of the manner in which the voter code is assigned to the voter, a record (which may be electronic or physical) is kept indicating which voter code was assigned to the voter so that the voter code can be matched to the voter at a later time. This record may be stored by the electronic pollbook or retained on a manual list. In step 1048, it is determined whether the pollbook will be creating the identification code. If so, then the "yes" path is taken to step 1050 where the electronic pollbook creates the identification code based on the voter code, as described herein. Otherwise, the "no" path is taken to step 1052 and the voting device will generate the identification code and print the identification code on the paper ballot, as described above in steps 1022-1030.

In step 1052, the electronic pollbook prints the activation card. The activation card is voter specific and, preferably, includes a code printed on it that identifies the precinct of the voter and the ballot style that the voter is entitled to vote. In this case, the voting device is able to read the code and automatically select the corresponding precinct and ballot style for the voter, as described above. If the identification code was created by the electronic pollbook in step 1050, then the identification code is also printed on the activation card.

In step 1054, if the electronic pollbook did not create the identification code for a provisional ballot that was assigned a voter code, then the electronic pollbook notifies the poll worker so that the voter code can be subsequently entered into the voting device by the poll worker in step 1024. The process then proceeds to step 1018 where the activation card is used to activate the voting device and the ballot casting process is performed in steps 1018-1040, as described above.

When the ballot casting process for a particular voter ends at step 1040, the process proceeds to step 1056. In step 1058, it is determined whether the polls are closed. If not, the "no" path is taken to step 1060 where it is determined whether there are more voters to cast ballots. If so, then the "yes" path is taken to step 1062 where the ballot casting process starts over again at step 1002. Otherwise, the "no" path is taken back to step 1058 (e.g., if there are no voters present). If the polls are closed, then the "yes" path is taken from step 1058 to step 1064.

In step 1064, the ballot tabulation device creates a summary of the election results, i.e., the total vote count for all of the CVRs stored on the ballot tabulation device. The inclusion of the CVRs for provisional ballots in the total vote count will be dependent on the jurisdiction, as described above. Preferably, the ballot tabulation device includes the eligibility status within the CVR for each provisional ballot, which indicates whether the CVR was included in the election results or not.

In step 1066, if the ballot tabulation device is being used on election day, the ballot tabulation device prints a summary tape showing the results for each contest in the election. The summary tape preferably shows the results by precinct. If the ballot tabulation device is being used during an early voting/in-person absentee voting period, a summary tape is typically not allowed to be printed. In this case, if a summary tape is printed at all, the printed tape only shows the number of ballots cast in each precinct at the polling location.

In step 1068, the ballot tabulation device stores a variety of information on a storage medium, and the storage medium is taken to a central site. The information stored on the storage medium may comprise, for example, the summary of the election results, all of the CVRs (including the eligibility status for each provisional ballot), the link between the CVR and voter code for each provisional ballot, and, in some embodiments, the link between the ballot code and voter code for each provisional ballot (in embodiments where the ballot code functions as the identification code) and/or the encryption key needed for voter code encryption or the decryption key needed for voter code decryption (in embodiments where the identification code comprises an encrypted voter code or a barcode that encodes an encrypted voter code). Each ballot tabulation device may have its own storage medium, or a plurality of ballot tabulation devices may store their information on one storage medium that is taken to the central site. Alternatively, the information may be electronically transmitted from the ballot tabulation device to the central site.

In step 1070, the election management system located at the central site reads the information from the storage medium for the ballot tabulation device and uploads the information to the EMS database. If the information was electronically transmitted from the ballot tabulation device to the central site, the information is uploaded to the EMS database in a similar manner.

In step 1072, each voter on the list of voters who has been assigned a voter code is reviewed to determine if the eligibility status of the voter and associated provisional ballot has changed. The eligibility determination is an administrative process handled by election officials. In step 1074, a list of voter codes whose eligibility status needs to change is created by the operator based on the eligibility review. It should be understood that the eligibility status will need to be changed if the voter was initially deemed to be an eligible voter, but the voter is determined to be ineligible to vote during the eligibility review. Conversely, the eligibility status will need to be changed if the voter was initially deemed to be an ineligible voter, but the voter is determined to be eligible to vote during the eligibility review.

In step 1076, a user accesses the election management system for the purpose of changing the eligibility status of certain voters based on the eligibility review, which will in turn cause the total vote count within the election results to be updated as described below.

In step 1078, the election management system accesses the EMS database and uses the link between the CVR and the voter code for each provisional ballot (which has been uploaded to the EMS database) to identify the CVR associated with each voter code, as described above. The election management system then generates one or more lists that associate each voter code with the eligibility status stored in the CVR. In some embodiments, the election management system generates two lists—one list for the voter codes associated with an "eligible" status and another list for the voter codes associated with an "ineligible" status. The list(s) may be displayed to the operator and/or used to change the eligibility status of certain voters.

Importantly, only the election management system can associate the voter code with the contest selections stored in the CVR so as to maintain the anonymity and secrecy of the voter's contest selections within the CVR. The list(s) generated by the election management system enable an operator to change the eligibility status of a voter without having access to the voter's contest selections within the CVR.

In step 1080, the operator inputs information into the election management system indicating each voter code whose eligibility status needs to be changed. It should be understood that the operator will reference the list of voter codes created in step 1074 to provide this input. In some embodiments, the election management system displays the two lists generated in step 1078—one list for the voter codes associated with an "eligible" status and another list for the voter codes associated with an "ineligible" status—and the operator drags a voter code from one list to the other to change the eligibility status. Of course, other methods of enabling the operator to input the change in eligibility status for each applicable voter code may also be used.

In step 1082, as the operator provides input on each voter code whose eligibility status is to be changed, the election management system updates the display showing the current eligibility status and also tracks the change. A display of eligible/ineligible lists is advantageous as it shows the current state of all coded ballots, provides easy verification of correct code handling, and enables easy correction of eligibility status.

In step 1084, it is determined whether all of the voter codes whose eligibility status is to be changed have been input into the election management system. If not, the "no" path proceeds back to step 1080 so that the operator can continue to change the eligibility status of one or more voter codes. Otherwise, the operator indicates that the process is complete and the "yes" path proceeds to step 1086.

In step 1086, the election management system updates the election results based on the changed eligibility status of certain voters. Specifically, the contest selections stored within each CVR associated with a voter code that needs to be included in the election results due to an eligibility change are added to the total vote count. Likewise, the contest selections stored within each CVR associated with a voter code that needs to be excluded from the election results due to an eligibility change are subtracted from the total vote count. The election management system also changes the eligibility status within the CVR for each voter code on the list.

In step 1088, the election management system builds a table of all identification codes that were excluded from the election results during step 1086. If this table existed before the update, it should be revised to represent the current list. In the event of a recount, this table can be downloaded to a ballot tabulation device used in the recount in order to skip the tabulation of any paper ballot containing an identification code on that list. This capability avoids the need to produce a list of excluded identification codes and locate the paper ballots whose identification codes are included on the list to thereby exclude them from the recount.

In step 1090, the election management system provides access to the updated results reports. These updated results include the changes made by the election management system as a result of including and/or excluding contest selections as described above. The updated results can be displayed in a format designated by the operator, such as by jurisdiction, precinct or any other style available. In step 1092, the results reporting process (including coded ballot adjudication) is complete.

Figure 11:
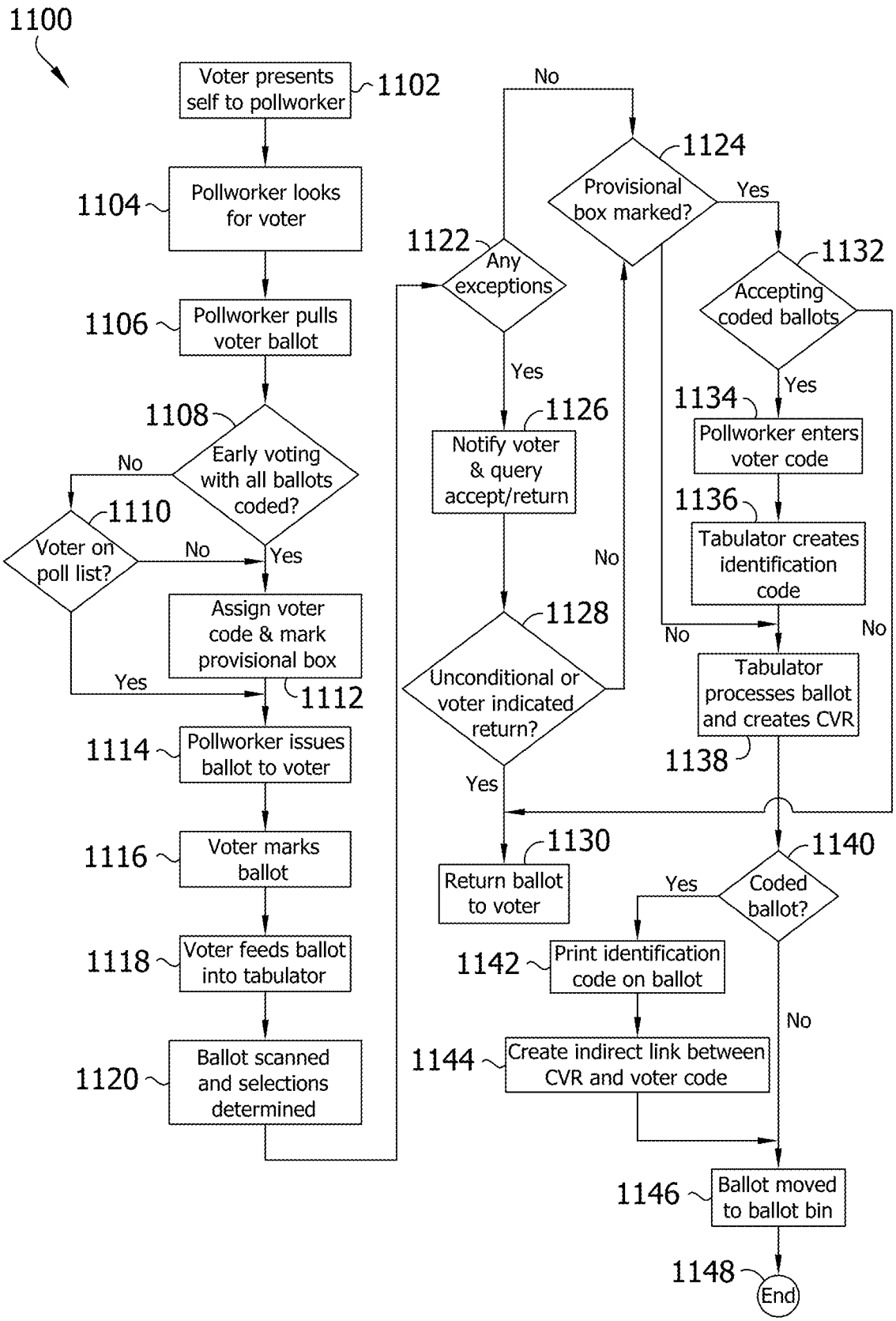
FIG. 11 is a flow diagram of a ballot casting and tabulation method that may be used to process paper ballots that are hand-marked by voters in accordance with an embodiment of the invention.

Referring to FIG. 11, a ballot casting and tabulation method to be used with paper ballots that are hand-marked by voters in accordance with an embodiment of the invention is generally indicated by reference numeral 1100.

In step 1102, a voter arrives at the polling location and checks in with a poll worker to establish his or her entitlement to vote. In step 1104, the poll worker uses a pollbook (either an electronic pollbook or physical pollbook) to check in the voter by attempting to find the voter in the voter registration records. If the voter is located, the ballot style and voting precinct for the voter will be established. In step 1106, the poll worker pulls a paper ballot for the voter. The paper ballot may comprise, for example, a blank preprinted full-face ballot on which the contest selections will be marked. Paper ballots are normally stocked by ballot style at a polling location. Thus, once a poll worker has established the voter's precinct and ballot style, the poll worker can pull a paper ballot corresponding to the ballot style for that voter.

In step 1108, it is determined whether the voter is voting during an early voting/in-person absentee voting period in which the jurisdiction assigns voter codes to every voter. If so, the "yes" path is taken to step 1112, indicating that the voter will be assigned a voter code to cast a provisional ballot. Otherwise, for example, if the voter is voting on election day or if the voter is voting during an early voting/in-person absentee voting period but the jurisdiction does not assign voter codes to every voter, the "no" path is taken to step 1110.

If the "no" path is taken to step 1110, a determination is made on whether the voter was located in the voter registration records, which will allow the voter's precinct and ballot style to be determined. In addition, even if the voter was located in the voter registration records, a determination is made on whether there is some other challenge to the voter's eligibility to vote in the current election. If the voter is not located in the voter registration records and/or the voter's eligibility to vote is being challenged, the "no" path is taken to step 1112, indicating that the voter will be assigned a voter code to cast a provisional ballot. If the voter is located in the voter registration records and the voter's eligibility to vote is not being challenged, the "yes" path is taken to step 1114, indicating that the voter will be casting a normal ballot to be included in the results of the election.

Reaching step 1112 indicates that the voter will be assigned a voter code to cast a provisional ballot. In step 1112, a voter code is assigned to the voter and a provisional box is marked on the paper ballot. This is typically done manually by a poll worker (e.g., the poll worker selects the voter code from a preprinted list of voter codes and places a preprinted sticker on the paper ballot, as well as marks the provisional box on the paper ballot). A record (which may be electronic or physical) is kept indicating which voter code was assigned to the voter so that the voter code can be matched to the voter at a later time. This record may be stored by an electronic pollbook or retained on a manual list.

In step 1114, the poll worker issues the paper ballot to the voter. In step 1116, the voter hand-marks his or her contest selections on the paper ballot, e.g., by darkening mark spaces on the ballot located adjacent the pre-printed contest choices. In step 1118, the voter or a poll worker inserts the marked paper ballot into a ballot tabulation device. In step 1120, the ballot tabulation device scans the paper ballot and determines the contest selections marked on the paper ballot. If the paper ballot comprises a full-face paper ballot, the ballot tabulation device may read the code channel and timing marks on the ballot to determine the marked voting selections, as described herein.

In step 1122, it is determined whether the paper ballot contains any ballot irregularities (i.e., exceptions) such as over votes, under votes, or blank ballots. If not, the "no" path is taken to step 1124. However, if there are any ballot irregularities, the "yes" path is taken to step 1126. In step 1126, the ballot tabulation device notifies the voter and/or poll worker of the one or more ballot irregularities and queries whether the paper ballot should be accepted or returned to the voter. This determination may depend on the configuration of the ballot tabulation device and/or the type of ballot irregularity. In some cases, the ballot tabulation device will not accept the paper ballot if there is a particular type of ballot irregularity and will unconditionally return the paper ballot to the voter. In other cases, the ballot tabulation device will allow the voter to indicate whether to accept the paper ballot "as is" or return the paper ballot to the voter for correction.

In step 1128, a determination is made on whether the paper ballot should be returned to the voter. If there are no ballot irregularities that would cause an unconditional return of the paper ballot or a return of the paper ballot due to voter indication, the "no" path is taken to step 1124. However, if one or more of such ballot irregularities exist, the "yes path is taken to step 1130. In step 1130, the paper ballot is ejected from the ballot tabulation device and returned to the voter. At this time, the voter may revise his or her ballot markings to address the one or more ballot irregularities and then re-enter the corrected paper ballot into the ballot tabulation device at step 1118. Alternatively, if step 1130 is reached from step 1132 described below (i.e., the paper ballot contains a marked provisional box but the ballot tabulation device is not configured to process provisional ballots), the paper ballot is returned for handling as a conventional provisional paper ballot in which the ballot is placed in ballot envelopes, as discussed above.

Referring now to step 1124, if there are no ballot irregularities that would cause return of the paper ballot to the voter, it is determined whether the paper ballot includes a marked provisional box (wherein the provisional box may be scanned simultaneously with the other information on the ballot). If not, the "no" path is taken to step 1138 where the ballot casting process for this voter is now complete. Otherwise, the "yes" path is taken to step 1132.

In step 1132, it is determined whether the ballot tabulation device is accepting coded ballots. If not, the "no" path is taken to step 1130 where the ballot tabulation device ejects the paper ballot for return to the voter. Otherwise, the "yes" path is taken to step 1134. In step 1134, the ballot tabulation device prompts the poll worker to enter the voter code assigned to the voter into the device. Alternatively, the ballot tabulation device may automatically select the next available voter code from a pre-established list of voter codes or generate a random voter code. In this case, the poll worker is notified of the chosen code and records the code for later use. After receipt of the voter code, in step 1136, the ballot tabulation device creates an identification code associated with or based on the voter code, as described herein. If the ballot code functions as the identification code, the ballot tabulation device may create a cross-reference table that associates the voter code with the ballot code or use some other means of linking the two codes.

In step 1138, the ballot tabulation device processes the paper ballot and creates a CVR to store the contest selections that were identified in step 1120. In step 1140, it is determined whether the paper ballot includes an identification code, i.e., is a provisional ballot. If not, the "no" path is taken to step 1146 where the ballot is moved to a ballot bin. Then, in step 1148, the ballot casting process for this voter is now complete. However, if the paper ballot includes an identification code, the "yes" path is taken to step 1142.

In step 1142, the ballot tabulation device prints the identification code created in step 1136 on the paper ballot. In step 1144, the ballot tabulation device creates a link between the voter code and CVR for the provisional ballot, as described herein, which may be used by the election management system to identify the CVR associated with a particular voter code. The process then proceeds to step 1146 where the ballot is moved to a ballot bin. Then, in step 1148, the ballot casting process for this voter is now complete.

It should be understood the ballot casting and tabulation method 400 shown in FIG. 11 is repeated for every voter and that, when the polls are closed, the post-closing steps shown in FIG. 10B (i.e., steps 1064 to 1092) are then performed. These post-closing steps will not be described again in the interest of brevity.

The voting systems and methods described herein provide advantages that were not previously available in paper-based voting systems. For example, the voting systems and methods maintain the anonymity and secrecy of provisional ballots while allowing the ballots to be adjudicated after the election. Also, the voting systems and methods are cost-effective (e.g., there is no need for envelopes to handle provisional ballots) and save time in processing provisional ballots, resulting in the provision of faster election results. In addition, the voting systems and methods provide the ability to recount all the ballots, if needed, without manually removing the ineligible ballots from the ballots being recounted. Of course, other advantages will be apparent to one skilled in the art.

II. Risk Limiting and Verification Audits

The voting systems described above may optionally be configured to enable the performance of a risk limiting audit (RLA), i.e., an audit of the election process that attempts to confirm that the individual designated as the winner for a particular contest is indeed the legitimate winner. The number of ballots examined in relation to a particular contest is determined from accepted statistical formulas based on the winning margin of votes and the number of ballots cast, as is known in the art. An alternative verification audit is also described.

The RLA methods described below require the generation of a unique ballot code for each paper ballot. The ballot code may comprise a numeric string, an alphanumeric string, or other types of codes known in the art. In some embodiments, the ballot code is a serialized number. In other embodiments, the ballot code is a random number, e.g., a number generated using a random number generator with a random seed (e.g., the fractional second digits in a real time clock). A precinct identifier and/or a machine identifier may optionally be appended to the ballot code in order to eliminate inadvertent duplicate code assignments.

Some voting systems may be used to process provisional ballots as described above and also implement the RLA methods described below. In some of these embodiments, the ballot code is different than the identification code printed on a provisional ballot, in which case the provisional ballot will include two codes—the identification code and the ballot code. In other embodiments, the ballot code functions as the identification code for a provisional ballot, as described above, in which case the provisional ballot will include only one code.

The RLA methods described below also require printing the ballot code on each paper ballot in human-readable and/or machine-readable form. In some embodiments, the ballot code is encoded in a barcode when printed on the paper ballot. The ballot code must also be linked (either directly or indirectly) to the CVR created when the paper ballot is scanned and tabulated by a ballot tabulation device so that the contest selections contained within the CVR may later be compared to either the physical ballot or an image of the physical ballot. In some embodiments, the ballot code is embedded in the CVR file itself. In other embodiments, the ballot code is embedded in the file label for the CVR file. In yet other embodiments, a table is created that associates the ballot code with the CVR identifier. Of course, other mechanisms may alternatively be used to link the ballot code to the CVR.

The RLA methods described below may be implemented by jurisdictions that utilize different types of voting equipment to process different types of paper ballots.

In some jurisdictions, voters are issued a full-face paper ballot on which the voter hand-marks his or her contest selections (e.g., by darkening mark spaces on the ballot located adjacent the pre-printed contest choices). Some voters may alternatively utilize a ballot marking device to machine-mark the contest selections on the paper ballot (such as the AutoMARK® voter assist terminal available from Election Systems & Software, LLC). In these jurisdictions, the ballot code is generated and printed on each paper ballot by the ballot tabulation device that is used to scan and tabulate the ballot, whether located at the precinct or at a central election site (e.g., the ballot tabulation device 154 shown in FIG. 1B). The ballot tabulation device also stores the ballot code in association with the CVR for the ballot.

Examples of suitable ballot tabulation devices that may be modified to enable the performance of a risk limiting audit (e.g., by adding all of the functionality relating to the generation and printing of a ballot code on the paper ballot and storing of the ballot code in association with the CVR for the ballot) are the DS200® precinct scanner and tabulator, the DS450® central scanner and tabulator, and the DS850® central scanner and tabulator, all of which are available from Election Systems & Software, LLC.

In other jurisdictions, voters enter their contest selections electronically using a ballot marking device that prints a summary of the contest selections on an activation card to create a paper ballot (e.g., the voting device 106 shown in FIG. 1A). Each paper ballot is then scanned and tabulated by a ballot tabulation device (e.g., the ballot tabulation device 154 shown in FIG. 1B or, alternatively, the voting device 106 shown in FIG. 1A when operated as a ballot marking device/ballot tabulation device). In these jurisdictions, the ballot code may be processed in different ways. In one embodiment, the voting device generates and prints the ballot code on each paper ballot and, then, the ballot tabulation device reads the ballot code from the paper ballot and stores the ballot code in association with the CVR for the ballot. In another embodiment, the ballot tabulation device generates and prints the ballot code on each paper ballot and also stores the ballot code in association with the CVR for the ballot.

Examples of suitable ballot marking devices and ballot tabulation devices that may be modified to enable the performance of a risk limiting audit (e.g., by adding all of the functionality relating to the generation and printing of a ballot code on the paper ballot and storing of the ballot code in association with the CVR for the ballot, as described above) are (i) the ExpressVote® universal voting system or ExpressVote® XL full-face universal voting system (when operated as a ballot marking device) in combination with the D5200® precinct scanner and tabulator or (ii) the ExpressVote® universal voting system or ExpressVote® XL full-face universal voting system (when operated as a combination ballot marking device/ballot tabulation device), all of which are available from Election Systems & Software, LLC.

Various methods that may be used to perform an audit using the voting systems shown in FIG. 1A and/or FIG. 1B will now be described. In the RLA methods, the ballot code for each paper ballot will be referred to as an "RLA code" for ease of reference. Of course, it should be understood that these methods are merely provided as exemplary embodiments and that other methods may also be used within the scope of the invention.

A. RLA: Comparison of Physical Ballot to CVR

A first exemplary method for performing a risk limiting audit includes two phases, i.e., a first voting and election reporting phase and a second audit phase.

In the first phase, a voting device and/or ballot tabulation device generates and prints an RLA code on each physical ballot and stores the RLA code in association with the CVR for the ballot. At poll closing, the ballot tabulation device creates a summary of the election results and stores the summary and CVRs on a storage medium. The storage medium and paper ballots are then taken to a central site for further processing and aggregation of the election results with those from other voting systems in the jurisdiction.

In the second phase, a list of RLA codes that have been randomly selected by a recognized RLA algorithm is input into a high speed scanner and tabulator, which is typically located at a central election office (referred to herein as the "audit scanner"). All of the physical ballots are fed through the audit scanner, which reads the RLA code on each ballot and sorts out any ballot with an RLA code that is included on the list of RLA codes. Then, for each of these ballots, the RLA code is used to locate the CVR associated with that RLA code. The physical ballot is then compared to the CVR to verify that the CVR content (e.g., the contest selections) reflects the contest selections made on the physical ballot and, if not, the discrepancies are tracked and a determination is made on whether additional ballots must be audited for verification with the culmination being a full recount.

Figure 12A:
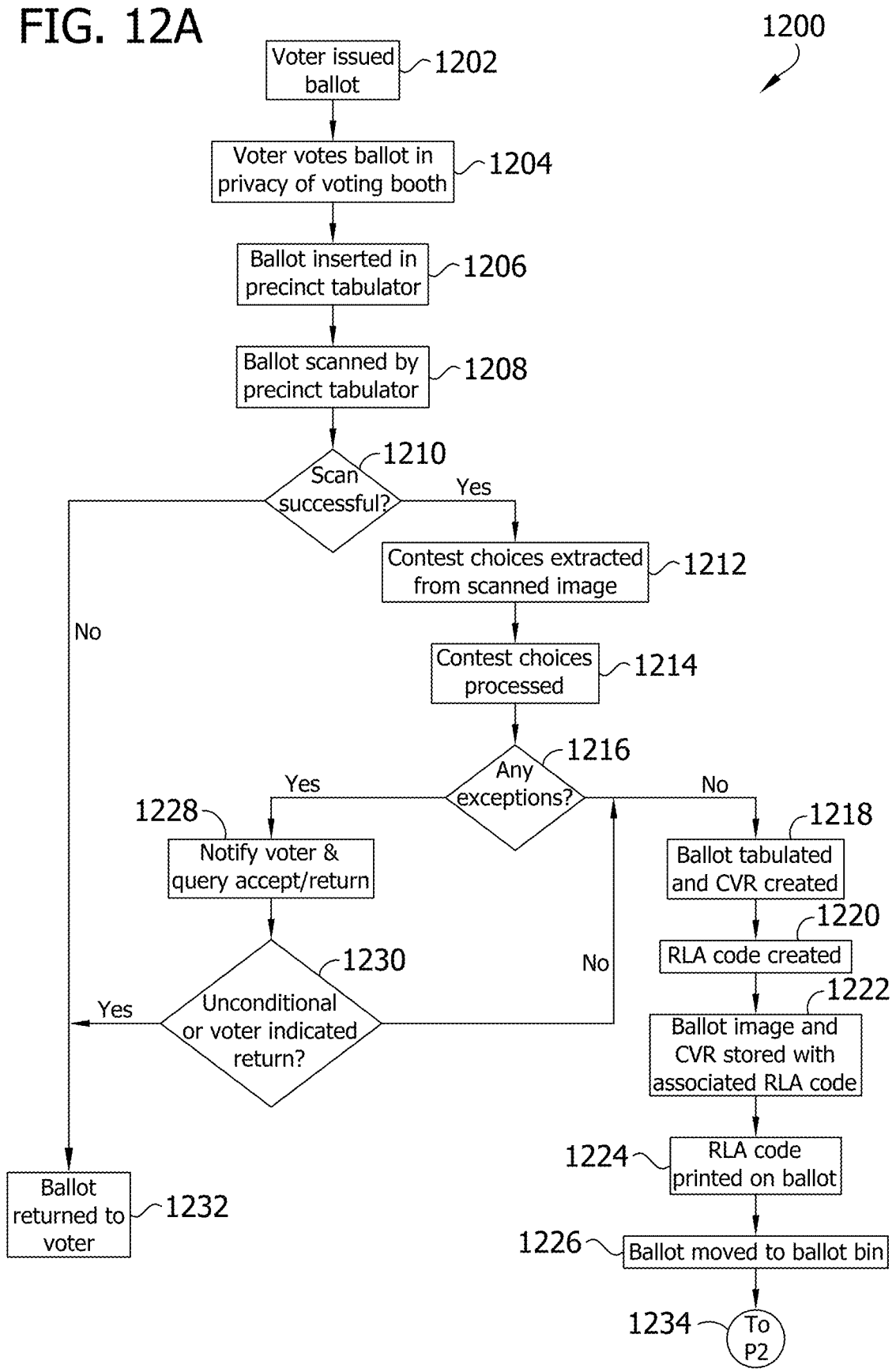
FIGS. 12A and 12B are flow diagrams of a method for performing a risk limiting audit in accordance with an embodiment of the invention.
Figure 12B:
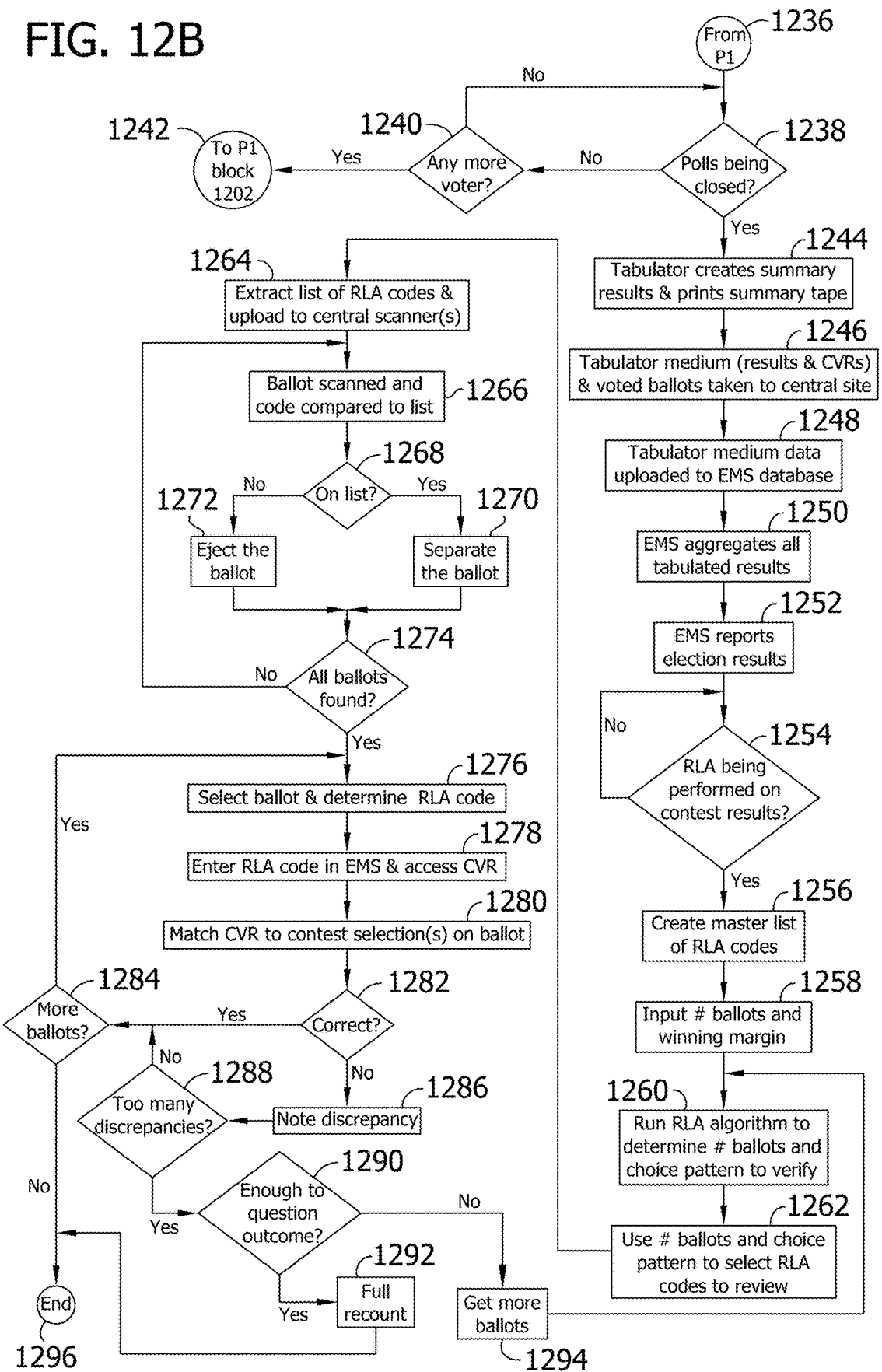

Referring to FIGS. 12A and 12B, a ballot casting and tabulation method to be used with paper ballots that are hand-marked by voters (FIG. 12A) and a method for performing a risk limiting audit after the close of the election (FIG. 12B) in accordance with an embodiment of the invention is generally indicated by reference numeral 1200.

In step 1202, a voter arrives at the polling location and checks in with a poll worker to establish his or her entitlement to vote. The poll worker uses a pollbook (either an electronic pollbook or physical pollbook) to locate the voter in the voter registration records. If the voter is located, the ballot style for the voter will be established and the poll worker pulls a paper ballot corresponding to the ballot style for that voter. The paper ballot may comprise, for example, a blank preprinted full-face ballot on which the contest selections will be marked. The poll worker issues the paper ballot to the voter.

In step 1204, the voter takes the paper ballot to a voting booth and hand-marks his or her contest selections on the ballot, e.g., by darkening mark spaces on the ballot located adjacent the pre-printed contest choices. In step 1206, the voter inserts the marked paper ballot into a ballot tabulation device. In step 1208, the ballot tabulation device scans the paper ballot to create an image of the ballot.

In step 1210, it is determined whether the scan was successful. There are numerous reasons why a scan may not be successful. The most common reason is that the voter causes a reading issue while the ballot is being inserted into the device (e.g., the voter holds onto the ballot as it is being pulled in; the voter inserts the ballot in a skewed manner, etc.). Other reasons include ballot flaws created during printing of the ballot (e.g., smudges or incomplete inking), markings in areas used for the code channel marks, timing marks, or orientation detection, or physical damage to the ballot (e.g., tears). If the scan was not successful, the "no" path is taken to step 1232 and the ballot is returned to the voter. At this point, the voter can either re-insert the ballot into the ballot tabulation device in step 1206, or, the ballot can be voided by the poll worker and a new ballot issued. However, if the scan was successful, the "yes" path is taken to step 1212.

In step 1212, the contest selections marked on the ballot are extracted from the ballot image. For example, the ballot tabulation device may read the code channel marks to determine the ballot style and active contest choices identified in the election definition, read the timing marks to determine the locations of the mark spaces, and analyze the mark spaces to determine which ones are marked, as described herein. Any mark space where something is detected but it doesn't meet the requirements of a valid mark may also be noted. In step 1214, the contest selections are processed to identify any ballot irregularities (i.e., exceptions) such as over votes, under votes, or blank ballots.

In step 1216, the ballot tabulation device determines whether there are any ballot irregularities (i.e., exceptions). If not, the "no" path is taken to step 1218. However, if there are any ballot irregularities, the "yes" path is taken to step 1228. In step 1228, the ballot tabulation device notifies the voter of the one or more ballot irregularities and queries whether the paper ballot should be accepted or returned to the voter. This determination may depend on the configuration of the ballot tabulation device and/or the type of ballot irregularity. In some cases, the ballot tabulation device will not accept the paper ballot if there is a particular type of ballot irregularity and will unconditionally return the paper ballot to the voter. In other cases, the ballot tabulation device will allow the voter to indicate whether to accept the paper ballot "as is" or return the paper ballot to the voter for correction.

In step 1230, a determination is made on whether the paper ballot should be returned to the voter. If there are no ballot irregularities that would cause an unconditional return of the paper ballot or a return of the paper ballot due to voter indication, the "no" path is taken to step 1218. However, if one or more of such ballot irregularities exist, the "yes path is taken to step 1232. In step 1232, the paper ballot is ejected from the ballot tabulation device and returned to the voter. At this time, the voter may revise his or her ballot markings to address the one or more ballot irregularities and then re-enter the corrected paper ballot into the ballot tabulation device at step 1206. Alternatively, the ballot can be voided by the poll worker and a new ballot issued.

In step 1218, the ballot tabulation device tabulates the votes on the ballot and creates a CVR to shows how all available votes in each contest were allocated. It should be understood that votes may be allocated to valid contest selections, contest under votes, or contest over votes. In step 1220, the ballot tabulation device creates an RLA code for the paper ballot, as described above. In step 1222, the RLA code is stored in association with the CVR for the ballot. In some embodiments, the RLA code is embedded in the CVR file itself or in the file label for the CVR file. In other embodiments, a table is created that associates the RLA code with the CVR identifier. Of course, other mechanisms may be used to associate the RLA code with the CVR. The RLA code may also be stored in association with the image of the ballot. Alternatively, the ballot image may be stored in association with the CVR, which is in turn associated with the RLA code.

In step 1224, the ballot tabulation device prints the RLA code on the paper ballot. The RLA should be printed in a designated area on the paper ballot that will not interfere with any subsequent reading of the ballot. The process then proceeds to step 1226 where the paper ballot is moved to a ballot bin. Then, in step 1234, the ballot casting process for this voter is now complete.

When the ballot casting process for a particular voter ends at step 1234, the process proceeds to step 1236. In step 1238, it is determined whether the polls are closed. If not, the "no" path is taken to step 1240 where it is determined whether there are more voters to cast ballots. If so, then the "yes" path is taken to step 1202 where the ballot casting process starts over again at step 1002. Otherwise, the "no" path is taken back to step 1238 (e.g., if there are no voters present). If the polls are closed, then the "yes" path is taken from step 1238 to step 1244.

In step 1244, the ballot tabulation device creates a summary of the election results, i.e., the total vote count for all of the CVRs stored on the ballot tabulation device. The ballot tabulation device also stores the election results summary and all of the CVRs and ballot images (including the RLA codes stored in association therewith) on a storage medium. Each ballot tabulation device may have its own storage medium, or a plurality of ballot tabulation devices may store their information on one storage medium. The storage medium is typically encrypted for security. If the ballot tabulation device is being used on election day, the ballot tabulation device also prints a summary tape showing the results for each contest in the election, which is typically signed by the poll workers and becomes an official affidavit of the election results. In step 1246, the storage medium and paper ballots are taken to a central site.

In step 1248, the election management system located at the central site reads the information from the storage medium for the ballot tabulation device and uploads the information to the EMS database. This will include the election results summary and all of the CVRs and ballot images (including the RLA codes stored in association therewith).

In step 1250, the election management system aggregates all of the election results summaries for all of the ballot tabulation devices in the jurisdiction. In step 1252, the election management system reports the aggregated election results, which can be used to publish jurisdiction wide unofficial election results (i.e., the election results are not official until certified by the canvassing board). The aggregated election results can also be evaluated for use in a post-election auditing process.

In step 1254, it is determined whether a risk limiting audit needs to be performed on one or more contest results. If so, the "yes" patent is taken to step 1256. However, if a risk limiting audit is not ready to be performed, the "no" path is taken back to step 1254 so as to wait until a risk limiting audit is to be performed.

In step 1256, the election management system creates a master list of RLA codes for all CVRs that have been uploaded to the EMS database. This master list may be created by extracting the RLA codes from the CVR files, extracting the RLA codes from the file names for the CVRs, extracting the RLA codes from the table that associates the RLA codes with the CVR identifiers, and the like.

In step 1258, the number of ballots cast for the contest and the winning margin of votes (i.e., the number of votes separating the winning candidate and the losing candidate) is entered into an accepted RLA algorithm, as is well known in the art. In a multi-seat contest, the number of votes separating the winning candidate with the least votes and the losing candidate with the most votes is entered. Note that if multiple contests are going to be concurrently audited, the contest with the smallest winning margin of votes will be used for the determination.

In step 1260, the RLA algorithm is run to determine the number of ballots to be examined in the audit and the pattern of how they are to be selected. It will also identify a threshold of tolerable discrepancies. If an audit of these ballots has already occurred and the number of discrepancies exceeded the threshold, the number of discrepancies will be used with the RLA algorithm to identify the number and selection pattern of additional ballots that need to be selected for audit. In step 1262, using the master list of RLA codes in conjunction with the number and selection pattern of ballots to be examined in the audit, a list is built of the RLA codes of the ballots to be examined in the audit.

In step 1264, the list of RLA codes of the paper ballots to be examined in the audit are extracted and uploaded to one or more audit scanners. If more than one audit scanner is to be used, the paper ballots are grouped in batches with their corresponding RLA codes separated into sub-lists. Each audit scanner can then identify when all required ballots have been found in the scanner's associated batch of ballots.

In step 1266, the audit scanner scans each paper ballot, reads the RLA code printed on the ballot, and compares the read RLA code to the list of RLA codes of the paper ballots to be examined. In step 1268, it is determined whether the RLA code is on the list of RLA codes. If the RLA code is on the list, then the "yes" path is taken to step 1270, and the paper ballot is separated out for manual audit and the RLA code is marked as found on the list. If the audit scanner has multiple output bins (e.g., the DS450® or DS850® central scanner and tabulator available from Election Systems & Software, LLC), the paper ballot will be ejected into a different output bin than the one into which the paper ballots with RLA codes that are not on the list will be ejected. If the RLA code is not printed on the ballot in textual as well as machine-readable form (e.g., if the RLA code is encoded in a barcode), the audit scanner will print a log listing the RLA codes of the separated ballots to be used later in the audit process. If the audit scanner only has one output bin, the scanner will stop and the last paper ballot ejected will be manually removed and placed in a separate stack for review. If the RLA code is not on the list, then the "no" path is taken to step 1272, and the paper ballot is ejected into the normal output bin.

In step 1274, it is determined whether all of the paper ballots with RLA codes on the list of RLA codes have been found. If not, then the "no" path is taken back to step 1266 to continue scanning paper ballots to locate those that are designated for audit. However, if all of the paper ballots have been found, then the "yes" path is taken to step 1276, which is the first step in auditing a paper ballot. Although the flow diagram shows that the audit process will not start until all of the paper ballots are found, it should be understood that the audit process may overlap with the ballot retrieval process.

In step 1276, a particular ballot is selected from the stack of ballots to be audited and the RLA code for the ballot is determined. If the RLA code is printed on the ballot in human-readable form, then the RLA code can simply be read by the auditor/reviewer. However, if the RLA code cannot be read directly by the auditor/reviewer (e.g., if the RLA code is not printed in human-readable form), then the RLA code can be retrieved from the log list printed by the audit scanner during the sorting process.

In step 1278, the RLA code is entered into the election management system to access the CVR associated with the RLA code. In step 1280, the auditor will visually compare the contest selection(s) made on the paper ballot to the contest selection(s) identified in the CVR. It should be noted that interpretation of voter intent can come into play if the marked contest selection(s) are not made according to the defined instructions and/or if the marking(s) cannot be reliably detected. In step 1282, it is determined whether the contest selections(s) in the CVR are correct. If so, the "yes" path is taken to step 1284, where it is determined whether there are more ballots to be audited. If so, the "yes" path is taken back to step 1276 to process more ballots. If not, the "no" path is taken to step 1296 and the audit process ends.

Referring back to step 1282, if the contest selections(s) in the CVR are not correct, the "no" path is taken to step 1286 and the discrepancy is noted and logged. Preferably, a discrepancy count is maintained for each candidate and contest being audited. In step 1288, it is determined whether the number of discrepancies is greater than the review threshold that has been established. If not, the "no" path is taken to step 1284, where it is determined whether there are more ballots to be audited. If so, the "yes" path is taken back to step 1276 to process more ballots. If not, the "no" path is taken to step 1296 and the audit process ends.

Referring back to step 1288, if the number of discrepancies is greater than the review threshold, the "yes" path is taken to step 1290. In step 1290, it is determined whether the discrepancies are sufficient to question the outcome of the contest. If not, the "no" path is taken to step 1294, where additional ballots are obtained for review. The RLA algorithm may be used to determine the number of additional ballots to be reviewed based on the number of discrepancies. However, if the discrepancies are sufficient to question the outcome of the contest and auditing additional ballots would not change this conclusion, the "yes" path is taken to step 1292 to perform a full recount of all of the paper ballots. In step 1296, the audit process is complete and either the outcome of the contest has been probabilistically confirmed or a full recount will be held to determine the winner(s) of the contest.

The methods described above with reference to FIGS. 12A and 12B relate to a jurisdiction that uses paper ballots that are hand-marked by voters (e.g., by darkening mark spaces on the ballot located adjacent the pre-printed contest choices). It should be understood that these methods may also be used to audit other types of paper ballots, such as paper ballots in which a summary of the contest selections is printed on an activation card. While these paper ballots do not have the potential for ambiguity of tabulation as does a hand-marked paper ballot, these ballots would also be assigned an RLA code for consistency of applying RLA procedures.

B. RLA: Comparison of Ballot Image to CVR

A second exemplary method for performing a risk limiting audit includes two phases, i.e., a first voting and election reporting phase and a second audit phase.

In the first phase, a voting device and/or ballot tabulation device generates and prints an RLA code on each physical ballot and stores the RLA code in association with the CVR for the ballot. At poll closing, the ballot tabulation device creates a summary of the election results and stores the summary and CVRs on a storage medium. The storage medium and paper ballots are then taken to a central site for further processing and aggregation of the election results with those from other voting systems in the jurisdiction. It can be appreciated that this phase is the same as the first phase of the first exemplary method (an embodiment of which was described above in connection with steps 1202-1252 of FIGS. 12A and 12B).

In the second phase, a list of RLA codes that have been randomly selected by a recognized RLA algorithm is input into an election management system (e.g., the election management system 156 shown in FIG. 1B). The election management system locates the CVR and ballot image associated with each CVR on the list. The ballot image is then compared to the CVR to verify that the CVR content (e.g., the contest selections) reflects the contest selections made on the physical ballot (as reflected in the ballot image) and, if not, the discrepancies are tracked and a determination is made on whether additional ballots must be audited for verification with the culmination being a full recount. It can be appreciated that this phase is similar to the second phase of the first exemplary method (an embodiment of which was described above in connection with steps 1256-1296 of FIG. 12B), with the exception that a high speed scanner and tabulator is not required and the CVR is compared to the ballot image stored by the election management system and not the paper ballot itself.

C. Verification Audit

A third exemplary method for performing an audit includes two phases, i.e., a first voting and election reporting phase and a second audit/verification phase (which is an alternative to a risk limiting audit).

In the first phase, a voting device and/or ballot tabulation device generates and prints a ballot code on each physical ballot and stores the ballot code in association with the CVR for the ballot. At poll closing, the ballot tabulation device creates a summary of the election results and stores the summary and CVRs on a storage medium. The storage medium and paper ballots are then taken to a central site for further processing and aggregation of the election results with those from other voting systems in the jurisdiction. It can be appreciated that this phase is the same as the first phase of the first exemplary method (an embodiment of which was described above in connection with steps 1202-1252 of FIGS. 12A and 12B) (noting, of course, that the RLA code referenced in connection with FIGS. 12A and 12B is the same as the ballot code referenced in connection with this embodiment).

In the second phase, a high speed scanner and tabulator is operated in a verification mode. In this mode, all of the CVRs are pre-loaded on the scanner prior to starting the verification process. The scanner is used to re-read each paper ballot and extract the contest selections in the same manner as was done when tabulating the ballot during the first phase. The scanner then uses the ballot code read from the paper ballot to locate the CVR, and the contest stored in the CVR are compared to the extracted contest selections from the verification scan. Any paper ballots in which the verification scan returns a different result than the original scan will have the differences documented in a report and the ballot is separated out for adjudication.

Referring to FIG. 13, a post-election method for performing a verification audit (i.e., the second phase of the method) in accordance with an embodiment of the invention is generally indicated by reference numeral 1300. This method may be performed by a single scanner or more than one scanner that are capable of operating in verification mode. If multiple scanners are used, batches of paper ballots are assigned to each scanner and only the CVRs associated with those batches are pre-loaded on the scanner.

In step 1302, the post-election verification method is started. In step 1304, the paper ballots and storage medium for the ballot tabulation device are collected at a central site. In step 1306, the election management system located at the central site reads the information from the storage medium for the ballot tabulation device and uploads the information to the EMS database. This will include the election results summary and all of the CVRs and ballot images (including the ballot codes stored in association therewith).

In step 1308, the election management system aggregates all of the election results summaries for all of the ballot tabulation devices in the jurisdiction. The election management system then reports the aggregated election results, which can be used to publish jurisdiction wide unofficial election results (i.e., the election results are not official until certified by the canvassing board).

In step 1310, it is determined whether an audit needs to be performed to verify the election results. If so, the "yes" patent is taken to step 1312. However, if the audit is not ready to be performed (e.g., if the unofficial election results have not yet been released), the "no" path is taken back to step 1310 so as to wait until an audit is ready to be performed.

In step 1312, the CVRs and their associated ballot codes are exported to one or more storage media. The performance of this step may depend on whether the verification process will be performed by a single scanner or more than one scanner. If using a single scanner, all of the CVRs and their associated ballot codes can be exported to a single storage medium. If using multiple scanners, the CVRs and their associated ballot codes may be exported to different storage media for processing in batches on different scanners (wherein the paper ballots are also separated into the same batches). Of course, the batch approach could be used even if using a single scanner.

In step 1314, the CVRs and associated ballot codes stored on a storage medium are loaded into a scanner. In step 1316, the scanner is set to operate in verification mode. Typically, the scanner will have multiple operation modes, such as a tabulation mode (as known in the art) and a verification mode, which can be selected by the operator of the scanner.

In step 1318, a batch of paper ballots (i.e., the ballots whose CVRs are loaded on the scanner) is loaded into the input hopper of the scanner, and the scanner is started. In step 1320, the scanner pulls a paper ballot from the stack and reads/scans the ballot. In step 1322, it is determined whether the ballot was successfully scanned so that the image can be processed. If the scan was successful, the "yes" path is taken to step 1324. If the scan was not successful, the "no" path is taken to step 1332. The scan may not be successful, for example, if the ballot did not complete the scanning process (e.g., if the ballot is jammed) or if the image was not able to be recognized as a valid ballot for processing (e.g., if the image is skewed).

In step 1324, the scanner extracts the ballot code from the image of the ballot. In step 1326, the set of CVRs and associated ballot codes is searched to determine whether the CVR associated with the ballot code of the current ballot can be found and retrieved. If the CVR is found and retrieved, the "yes" path is taken to step 1328. However, the "no" path is taken to step 1332 is the CVR cannot be found or retrieved.

In step 1328, the ballot image is processed to determine the contest selections marked on the ballot (i.e., using the same process used by the ballot tabulation device that created the CVR). The contest selections as determined by the scanner are then compared to the contests selections stored in the CVR. In step 1330, it is determined whether that comparison yields an exact match. If so, the "yes" path is taken to step 1334. However, if there is any discrepancy, the "no" path is taken to step 1332.

Step 1332 is reached if there is any issue with scanning, processing or verifying a ballot. In all of these cases, the ballot is separated and the issue is identified in association with the ballot code (via an output printer, a screen display, or some other logging means). If the scanner has more than one output hopper, the ballot may be sorted to a different output hopper than the other ballots. If the scanner only has a single output hopper, the scanner may temporarily stop to enable removal of the ballot.

In step 1334, it is determined whether there are more ballots in the input hopper of the scanner. If so, the "yes" path is taken to step 1320 so that the next ballot may be read. Otherwise, if the input hopper is empty, the "no" path is taken to step 1336.

In step 1336, it is determined whether any ballots have been separated out in step 1332. If so, the "yes" path is taken to step 1338. However, if all of the ballots were successfully scanned and verified, the "no" path is taken to step 1350.

In step 1338, it is determined whether any ballots were separated out due to an unsuccessful scan. If not, the "no" path is taken to step 1342. Otherwise, the "yes" path is taken to step 1340, where the reason for the unsuccessful scan is determined. Because each ballot was able to be originally scanned by the ballot tabulation device, the resolution will typically be to re-scan the ballot (unless the paper ballot has been subsequently damaged).

In step 1342, it is determined whether any ballots were separated out because the CVR could not be found. If not, the "no" path is taken to step 1346. Otherwise, the "yes" path is taken to step 1344, where the issue must be reconciled with the source EMS database. There are two reasons why a CVR may not be found. First, the ballot code may not have been printed on the paper ballot. This may occur, for example, if the ballot tabulation device that originally scanned and tabulated the ballot was not capable of creating and/or printing the ballot code on the ballot or if the ballot was never scanned and tabulated at all. These ballots cannot be verified. The second reason why a CVR may not be found is that the CVR for the ballot was not loaded into this scanner. This may occur if the CVR was not loaded at all or if the CVR was loaded onto another scanner. This issue must be reconciled and the ballot reread as required.

In step 1346, it is determined whether any ballots were separated out because the contest selections as determined by the scanner did not match the contests selections stored in the CVR. If not, the "no" path is taken to step 1350. Otherwise, the "yes" path is taken to step 1348, where the difference must be adjudicated. Unless there were major tabulation failures, the most likely reason for a mismatch is that the voter marks do not fully comply with the mark requirements resulting in inconsistent mark reading and tabulation. Filtering out these ballots is the goal of the verification process. These ballots will need to be adjudicated as to what the intended vote is and local procedures used to determine how reported results will be adjusted.

In step 1350, it is determined whether all of the ballots have been read. If there are additional ballots to be processed on this scanner, the "no" path is taken to step 1318 to continue the process. However, if all of the ballots that were intended to be processed on this scanner have been read (including any ballots that are being reread), the "yes" path is taken to step 1352 to end the verification process for the designated batch.

III. General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as" or "for example") provided with respect to certain embodiments is intended merely to better describe the invention and does not pose a limitation on the scope of the invention. No language in the description should be construed as indicating any non-claimed element essential to the practice of the invention.

The use of the terms "comprises," "comprising," or any other variation thereof, are intended to cover a non-exclusive inclusion, such that a system or method that comprises a list of elements does not include only those elements, but may include other elements not expressly listed or inherent to such system or method.

Finally, while the present invention has been described and illustrated hereinabove with reference to various exemplary embodiments, it should be understood that various modifications could be made to these embodiments without departing from the scope of the invention. Therefore, the present invention is not to be limited to the specific structural configurations or methodologies of the exemplary embodiments, except insofar as such limitations are included in the following claims.

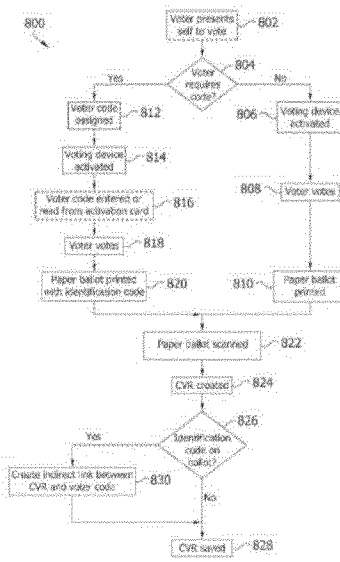

What is claimed and desired to be secured by Letters Patent is as follows:

1. A voting system, comprising:
    a ballot tabulation device configured to tabulate a plurality of paper ballots cast by a plurality of voters in an election, wherein one or more of the paper ballots comprises a provisional ballot on which is printed an identification code that represents a voter code assigned to a voter who cast the provisional ballot, wherein the ballot tabulation device tabulates each paper ballot by determining one or more contest selections marked on the paper ballot and storing the contest selections within a cast vote record (CVR) for the paper ballot and, for each provisional ballot, additionally providing a link between the CVR and the voter code for the provisional ballot; and
    an election management system configured to use the link to identify the CVR associated with each of one or more voter codes identified as having a change in eligibility status, wherein the election management system is configured to update a total vote count by either (i) including the contest selections stored within the CVR in the total vote count when an eligibility determination indicates the voter associated with the identified voter code is an eligible voter or (ii) exclude the contest selections stored within the CVR from the total vote count when an eligibility determination indicates the voter associated with the identified voter code is an ineligible voter.

2. The voting system of claim 1, wherein the ballot tabulation device is configured to provide a user interface that enables an operator to enter the voter code for the provisional ballot, wherein the ballot tabulation device is also configured to generate the identification code based on the voter code and print the identification code on the provisional ballot.

3. The voting system of claim 1, further comprising a voting device configured to provide a user interface that enables a voter to input the contest selections, wherein the voting device is also configured to mark the contest selections on a paper activation card or other paper medium to create the paper ballot.

4. The voting system of claim 1, wherein the identification code printed on the provisional ballot comprises the voter code or a barcode that encodes the voter code.

5. The voting system of claim 4, wherein the CVR for the provisional ballot includes a CVR identifier, wherein the ballot tabulation device is configured to provide the link by creating a cross-reference table that associates the voter code with the CVR identifier, and wherein the election management system is configured to access the cross-reference table to identify the CVR associated with each inputted voter code.

6. The voting system of claim 1, wherein the ballot tabulation device and the election management system are each configured to prevent a user from accessing the contest selections stored in the CVR for the provisional ballot.

7. A voting system, comprising:
    a ballot tabulation device configured to tabulate a plurality of paper ballots cast by a plurality of voters in an election, wherein one or more of the paper ballots comprises a provisional ballot, wherein the ballot tabulation device tabulates each paper ballot by determining one or more contest selections marked on the paper ballot and storing the contest selections within a cast vote record (CVR) for the paper ballot and, for each provisional ballot, the ballot tabulation device is further configured to provide a user interface that enables an operator to enter a voter code assigned to a voter who cast the provisional ballot and, in response, the ballot tabulation device is configured to print an identification code associated with the voter code on the provisional ballot and provide a link between the CVR and the voter code for the provisional ballot; and
    an election management system configured to use the link to identify the CVR associated with each of one or more voter codes identified as having a change in eligibility status, wherein the election management system is configured to update a total vote count by either (i) including the contest selections stored within the CVR in the total vote count when an eligibility determination indicates the voter associated with the identified voter code is an eligible voter or (ii) exclude the contest selections stored within the CVR from the total vote count when an eligibility determination indicates the voter associated with the identified voter code is an ineligible voter.

8. The voting system of claim 7, wherein the identification code printed on the provisional ballot comprises the voter code or a barcode that encodes the voter code.

9. The voting system of claim 8, wherein the CVR for the provisional ballot includes a CVR identifier, wherein the ballot tabulation device is configured to provide the link by creating a cross-reference table that associates the voter code with the CVR identifier, and wherein the election management system is configured to access the cross-reference table to identify the CVR associated with each inputted voter code.

10. The voting system of claim 7, wherein the ballot tabulation device and the election management system are each configured to prevent a user from accessing the contest selections stored in the CVR for the provisional ballot.

11. A voting system, comprising:
a ballot tabulation device configured to tabulate a plurality of paper ballots cast by a plurality of voters in an election, wherein one or more of the paper ballots comprises a provisional ballot on which is printed an identification code associated with a voter code assigned to a voter who cast the provisional ballot, wherein the ballot tabulation device tabulates each paper ballot by determining one or more contest selections marked on the paper ballot and storing the contest selections within a cast vote record (CVR) for the paper ballot and, for each provisional ballot, additionally providing a link between the CVR and the voter code for the provisional ballot; and
an election management system configured to identify the CVR associated with each of one or more voter codes identified as having a change in eligibility status, wherein the election management system is configured to update a total vote count by either (i) including the contest selections stored within the CVR in the total vote count when an eligibility determination indicates the voter associated with the identified voter code is an eligible voter or (ii) exclude the contest selections stored within the CVR from the total vote count when an eligibility determination indicates the voter associated with the identified voter code is an ineligible voter, and wherein the election management system is configured to prevent a user from accessing the contest selections stored in the CVR for the provisional ballot.

12. The voting system of claim 11, wherein the ballot tabulation device is configured to provide a user interface that enables an operator to enter the voter code for the provisional ballot, wherein the ballot tabulation device is also configured to generate the identification code based on the voter code and print the identification code on the provisional ballot.

13. The voting system of claim 11, further comprising a voting device configured to provide a user interface that enables a voter to input the contest selections, wherein the voting device is also configured to mark the contest selections on a paper activation card or other paper medium to create the paper ballot.

14. The voting system of claim 11, wherein the identification code comprises the voter code or a barcode that encodes the voter code.

15. The voting system of claim 14, wherein the CVR for the provisional ballot includes a CVR identifier, wherein the ballot tabulation device is configured to create a cross-reference table that associates the voter code with the CVR identifier, and wherein the election management system is configured to access the cross-reference table to identify the CVR associated with each of the inputted voter codes.

* * * * *

UNITED STATES PATENT AND TRADEMARK OFFICE
CERTIFICATE OF CORRECTION

PATENT NO. : 11,276,262 B2
APPLICATION NO. : 16/942637
DATED : March 15, 2022
INVENTOR(S) : Deutsch et al.

It is certified that error appears in the above-identified patent and that said Letters Patent is hereby corrected as shown below:

On the Title Page

Delete the title page and substitute therefore with the attached title page, showing the corrected number of Claims.

In the Claims

Replace Column 41, Line 39-Column 44, Line 30, (approx.) the following Claims:
--1. A voting system, comprising:
a ballot tabulation device configured to tabulate a plurality of paper ballots cast by a plurality of voters in an election, wherein one or more of the paper ballots comprises a provisional ballot on which is printed an identification code that represents a voter code assigned to a voter who cast the provisional ballot, wherein the ballot tabulation device tabulates each paper ballot by determining one or more contest selections marked on the paper ballot and storing the contest selections within a cast vote record (CVR) for the paper ballot and, for each provisional ballot, additionally providing a link between the CVR and the voter code for the provisional ballot; and
an election management system configured to use the link to identify the CVR associated with each of one or more voter codes identified as having a change in eligibility status, wherein the election management system is configured to update a total vote count by either (i) including the contest selections stored within the CVR in the total vote count when an eligibility determination indicates the voter associated with the identified voter code is an eligible voter or (ii) exclude the contest selections stored within the CVR from the total vote count when an eligibility determination indicates the voter associated with the identified voter code is an ineligible voter.

2. The voting system of claim 1, wherein the ballot tabulation device is configured to provide a user interface that enables an operator to enter the voter code for the provisional ballot, wherein the ballot tabulation device is also configured to generate the identification code based on the voter code and print the identification code on the provisional ballot.

Signed and Sealed this
Seventeenth Day of May, 2022

Katherine Kelly Vidal
*Director of the United States Patent and Trademark Office*

3. The voting system of claim 1, further comprising a voting device configured to provide a user interface that enables a voter to input the contest selections, wherein the voting device is also configured to mark the contest selections on a paper activation card or other paper medium to create the paper ballot.

4. The voting system of claim 3, wherein the voting device is configured to provide a user interface that enables an operator to enter the voter code for the provisional ballot, wherein the voting device is also configured to generate the identification code based on the voter code and print the identification code on the provisional ballot.

5. The voting system of claim 3, further comprising an electronic pollbook configured to assign the voter code to the provisional ballot, wherein the electronic pollbook is also configured to generate the identification code based on the voter code and print the identification code on the paper activation card or other paper medium.

6. The voting system of claim 1, wherein the identification code printed on the provisional ballot comprises the voter code or a barcode that encodes the voter code.

7. The voting system of claim 6, wherein the CVR for the provisional ballot includes a CVR identifier, wherein the ballot tabulation device is configured to provide the link by creating a cross-reference table that associates the voter code with the CVR identifier, and wherein the election management system is configured to access the cross-reference table to identify the CVR associated with each inputted voter code.

8. The voting system of claim 1, wherein the identification code printed on the provisional ballot comprises an encrypted voter code or a barcode that encodes the encrypted voter code, wherein the encrypted voter code is generated by encrypting the voter code using an encryption key.

9. The voting system of claim 8, wherein the CVR for the provisional ballot includes a CVR identifier, wherein the ballot tabulation device is configured to provide the link by creating a cross-reference table that associates the encrypted voter code with the CVR identifier, and wherein the election management system is configured to encrypt each inputted voter code using the encryption key and then access the cross-reference table to identify the CVR associated with the inputted voter code as encrypted.

10. The voting system of claim 8, wherein the ballot tabulation device is configured to provide the link by storing the encrypted voter code within the CVR for the provisional ballot, and wherein the election management system is configured to encrypt each inputted voter code using the encryption key and then identify the CVR that stores the inputted voter code as encrypted.

11. The voting system of claim 8, wherein the ballot tabulation device is configured to provide the link by storing the encrypted voter code within the CVR for the provisional ballot, and wherein the election management system is configured to decrypt the encrypted voter code stored within each CVR using a decryption key and then identify the CVR that stores the inputted voter code.

12. The voting system of claim 1, wherein the ballot tabulation device and the election management system are each configured to prevent a user from accessing the contest selections stored in the CVR for the provisional ballot.

13. A voting system, comprising:
a ballot tabulation device configured to tabulate a plurality of paper ballots cast by a plurality of voters in an election, wherein one or more of the paper ballots comprises a provisional ballot, wherein the ballot tabulation device tabulates each paper ballot by determining one or more contest selections marked on the paper ballot and storing the contest selections within a cast vote record (CVR) for the paper ballot and, for each provisional ballot, the ballot tabulation device is further configured to provide a user interface that enables an operator to enter a voter code assigned to a voter who cast the provisional ballot and, in response, the ballot tabulation device is configured to print an identification code associated with the voter code on the provisional ballot and provide a link between the CVR and the voter code for the provisional ballot; and
an election management system configured to use the link to identify the CVR associated with each of one or more voter codes identified as having a change in eligibility status, wherein the election management system is configured to update a total vote count by either (i) including the contest selections stored within the CVR in the total vote count when an eligibility determination indicates the voter associated with the identified voter code is an eligible voter or (ii) exclude the contest selections stored within the CVR from the total vote count when an eligibility determination indicates the voter associated with the identified voter code is an ineligible voter.

14. The voting system of claim 13, wherein the identification code printed on the provisional ballot comprises the voter code or a barcode that encodes the voter code.

15. The voting system of claim 14, wherein the CVR for the provisional ballot includes a CVR identifier, wherein the ballot tabulation device is configured to provide the link by creating a cross-reference table that associates the voter code with the CVR identifier, and wherein the election management system is configured to access the cross-reference table to identify the CVR associated with each inputted voter code.

16. The voting system of claim 13, wherein the identification code printed on the provisional ballot comprises an encrypted voter code or a barcode that encodes the encrypted voter code, wherein the encrypted voter code is generated by encrypting the voter code using an encryption key.

17. The voting system of claim 16, wherein the CVR for the provisional ballot includes a CVR identifier, wherein the ballot tabulation device is configured to provide the link by creating a cross-reference table that associates the encrypted voter code with the CVR identifier, and wherein the election management system is configured to encrypt each inputted voter code using the encryption key and then access the cross-reference table to identify the CVR associated with the inputted voter code as encrypted.

18. The voting system of claim 16, wherein the ballot tabulation device is configured to provide the link by storing the encrypted voter code within the CVR for the provisional ballot, and wherein the election management system is configured to encrypt each inputted voter code using the encryption key and then identify the CVR that stores the inputted voter code as encrypted.

19. The voting system of claim 16, wherein the ballot tabulation device is configured to provide the link by storing the encrypted voter code within the CVR for the provisional ballot, and wherein the election management system is configured to decrypt the encrypted voter code stored within each CVR using a decryption key and then identify the CVR that stores the inputted voter code.

20. The voting system of claim 13, wherein the ballot tabulation device and the election management system are each configured to prevent a user from accessing the contest selections stored in the CVR for the provisional ballot.

21. A voting system, comprising:
a ballot tabulation device configured to tabulate a plurality of paper ballots cast by a plurality of voters in an election, wherein one or more of the paper ballots comprises a provisional ballot on which is printed an identification code associated with a voter code assigned to a voter who cast the provisional ballot, wherein the ballot tabulation device tabulates each paper ballot by determining one or more contest selections marked on the paper ballot and storing the contest selections within a cast vote record (CVR) for the paper ballot and, for each provisional ballot, additionally providing a link between the CVR and the voter code for the provisional ballot; and
an election management system configured to identify the CVR associated with each of one or more voter codes identified as having a change in eligibility status, wherein the election management system is configured to update a total vote count by either (i) including the contest selections stored within the CVR in the total vote count when an eligibility determination indicates the voter associated with the identified voter code is an eligible voter or (ii) exclude the contest selections stored within the CVR from the total vote count when an eligibility determination indicates the voter associated with the identified voter code is an ineligible voter, and wherein the election management system is configured to prevent a user from accessing the contest selections stored in the CVR for the provisional ballot.

22. The voting system of claim 21, wherein the ballot tabulation device is configured to provide a user interface that enables an operator to enter the voter code for the provisional ballot, wherein the ballot tabulation device is also configured to generate the identification code based on the voter code and print the identification code on the provisional ballot.

23. The voting system of claim 21, further comprising a voting device configured to provide a user interface that enables a voter to input the contest selections, wherein the voting device is also configured to mark the contest selections on a paper activation card or other paper medium to create the paper ballot.

24. The voting system of claim 23, wherein the voting device is configured to provide a user interface that enables an operator to enter the voter code for the provisional ballot, wherein the voting device is also configured to generate the identification code based on the voter code and print the identification code on the provisional ballot.

25. The voting system of claim 23, further comprising an electronic pollbook configured to assign the voter code to the provisional ballot, wherein the electronic pollbook is also configured to generate the identification code based on the voter code and print the identification code on the paper activation card or other paper medium.

26. The voting system of claim 21, wherein the identification code comprises the voter code or a barcode that encodes the voter code.

27. The voting system of claim 26, wherein the CVR for the provisional ballot includes a CVR identifier, wherein the ballot tabulation device is configured to create a cross-reference table that associates the voter code with the CVR identifier, and wherein the election management system is configured to access the cross-reference table to identify the CVR associated with each of the inputted voter codes.

28. The voting system of claim 21, wherein the identification code comprises an encrypted voter code or a barcode that encodes the encrypted voter code, wherein the encrypted voter code is generated by encrypting the voter code using an encryption key.

29. The voting system of claim 28, wherein the CVR for the provisional ballot includes a CVR identifier, wherein the ballot tabulation device is configured to create a cross-reference table that associates the encrypted voter code with the CVR identifier, and wherein the election management system is configured to encrypt each of the inputted voter codes using the encryption key and then access the cross-reference table to identify the CVR associated with each of the inputted voter codes as encrypted.

30. The voting system of claim 28, wherein the ballot tabulation device is configured to store the encrypted voter code within the CVR for the provisional ballot, and wherein the election management system is configured to either (i) encrypt each of the inputted voter codes using the encryption key and then identify the CVR that stores each of the inputted voter codes as encrypted or (ii) decrypt the encrypted voter code stored within each CVR using a decryption key and then identify the CVR that stores each of the inputted voter codes.--.

(12) United States Patent
Deutsch et al.

(10) Patent No.: US 11,276,262 B2
(45) Date of Patent: Mar. 15, 2022

(54) VOTING SYSTEMS AND METHODS FOR PROCESSING PROVISIONAL BALLOTS AND PERFORMING A RISK LIMITING AUDIT

(71) Applicant: ELECTION SYSTEMS & SOFTWARE, LLC, Omaha, NE (US)

(72) Inventors: Herman Deutsch, Mundelein, IL (US); Mike Dvorak, Plattsmouth, NE (US)

(73) Assignee: ELECTION SYSTEMS & SOFTWARE, LLC, Omaha, NE (US)

(*) Notice: Subject to any disclaimer, the term of this patent is extended or adjusted under 35 U.S.C. 154(b) by 0 days.

(21) Appl. No.: 16/942,637

(22) Filed: Jul. 29, 2020

(65) Prior Publication Data
US 2020/0357215 A1 Nov. 12, 2020

Related U.S. Application Data

(63) Continuation-in-part of application No. 16/256,420, filed on Jan. 24, 2019, now Pat. No. 11,011,005.

(51) Int. Cl.
*G06K 17/00* (2006.01)
*G07C 13/00* (2006.01)
(Continued)

(52) U.S. Cl.
CPC .......... *G07C 13/00* (2013.01); *G06F 16/901* (2019.01); *G06F 16/9035* (2019.01);
(Continued)

(58) Field of Classification Search
CPC ....... G07C 13/00; G06F 16/93; G06F 16/901; G06F 16/9038; G06F 16/9035;
(Continued)

(56) References Cited

U.S. PATENT DOCUMENTS 7,635,087 B1* 12/2009 Chung ............... G06K 7/14 235/386
2005/0211778 A1* 9/2005 Biddulph ............ G07C 13/00 235/386

(Continued)

*Primary Examiner* — Thien M Le
(74) *Attorney, Agent, or Firm* — Stinson LLP

(57) ABSTRACT

A voting system comprises a ballot tabulation device that tabulates each of a plurality of paper ballots by determining one or more contest selections marked on the paper ballot and storing the contest selections within a cast vote record (CVR) for the paper ballot. One or more of the paper ballots comprises a provisional ballot on which is printed an identification code that represents or is associated with a voter code assigned to a voter who cast the provisional ballot. During the tabulation process, a direct or indirect link is provided between the CVR and the voter code for the provisional ballot. The voting system also comprises an election management system that identifies the CVR associated with each of one or more inputted voter codes, i.e., the voter codes assigned to voters who have had a change in eligibility status, and updates the total vote count to include or exclude the contest selections stored within that CVR as applicable. Preferably, the election management system is configured to prevent a user from accessing the contest selections stored in the CVR for the provisional ballot based on the voter code. For audit purposes, a ballot code may also be printed on each paper ballot, wherein the ballot code may optionally serve as the identification code for a provisional ballot.

30 Claims, 15 Drawing Sheets